(12) United States Patent
Hung et al.

(10) Patent No.: US 10,000,419 B1
(45) Date of Patent: Jun. 19, 2018

(54) COMPOSITIONS AND METHODS ASSOCIATED WITH INTERCALATING AND EXFOLIATING A SAMPLE

(71) Applicants: Ching-Cheh Hung, Westlake, OH (US); Janet B. Hurst, Columbia Station, OH (US); Maricela Lizcano, Rocky River, OH (US); Diana Santiago, North Ridgeville, OH (US)

(72) Inventors: Ching-Cheh Hung, Westlake, OH (US); Janet B. Hurst, Columbia Station, OH (US); Maricela Lizcano, Rocky River, OH (US); Diana Santiago, North Ridgeville, OH (US)

(73) Assignee: The United States of America as Represented by the Administrator of National Aeronautics and Space Administration, Washington, DC (US)

( * ) Notice: Subject to any disclaimer, the term of this patent is extended or adjusted under 35 U.S.C. 154(b) by 0 days. days.

(21) Appl. No.: 14/948,581

(22) Filed: Nov. 23, 2015

(51) Int. Cl.
  *C01B 31/00* (2006.01)
  *C04B 35/583* (2006.01)

(52) U.S. Cl.
  CPC .................. *C04B 35/583* (2013.01)

(58) Field of Classification Search
  CPC ....... C01B 31/00; C01B 31/04; C01B 31/041; C01B 31/0423; C04B 35/536
  See application file for complete search history.

(56) References Cited

U.S. PATENT DOCUMENTS

| | | | | |
|---|---|---|---|---|
| 4,895,713 A * | 1/1990 | Greinke | ............. | C01B 31/0415 252/502 |
| 5,186,919 A * | 2/1993 | Bunnell | ................. | B02C 19/10 423/448 |
| 5,582,811 A * | 12/1996 | Greinke | ............... | C04B 35/536 264/31 |
| 5,694,343 A | 12/1997 | Nobutoki | | |
| 6,669,919 B1 * | 12/2003 | Greinke | ............. | C01B 31/0423 423/448 |
| 6,981,671 B1 | 1/2006 | Baron et al. | | |
| 7,105,108 B2 * | 9/2006 | Kaschak | ................ | B82Y 30/00 252/378 R |
| 7,451,122 B2 | 11/2008 | Dietrich et al. | | |
| 7,499,050 B2 | 3/2009 | Wu et al. | | |
| 7,734,453 B2 | 6/2010 | Kikuchi et al. | | |
| 7,790,285 B2 * | 9/2010 | Zhamu | .................. | B82Y 30/00 428/402 |
| 7,799,309 B2 * | 9/2010 | Reynolds, III | ...... | C01B 31/0415 423/448 |
| 8,065,022 B2 | 11/2011 | Minto et al. | | |
| 8,414,799 B2 * | 4/2013 | Pu | ......................... | B82Y 30/00 252/378 R |
| 8,524,067 B2 * | 9/2013 | Zhamu | .................. | B82Y 30/00 205/555 |
| 8,612,186 B2 | 12/2013 | Wu et al. | | |

(Continued)

*Primary Examiner* — Noah S Wiese
(74) *Attorney, Agent, or Firm* — Robert H. Earp, III; William M. Johnson

(57) ABSTRACT

Compositions and methods associated with intercalating and exfoliating a sample are described herein. For example, of a method may include mixing the sample with intercalation materials. The intercalation materials are then intercalated into the sample to obtain a sample intercalated with the intercalation materials. The intercalated sample can then be exfoliated to produce an exfoliated sample.

20 Claims, 30 Drawing Sheets

(56) References Cited

U.S. PATENT DOCUMENTS

| | | | |
|---|---|---|---|
| 8,903,995 B1 | 12/2014 | Basak et al. | |
| 2004/0019469 A1 | 1/2004 | Leary et al. | |
| 2005/0205847 A1* | 9/2005 | Dailly .................... | B82Y 30/00 |
| | | | 252/378 R |
| 2012/0205606 A1* | 8/2012 | Lee ......................... | H01L 45/04 |
| | | | 257/2 |
| 2014/0358476 A1 | 12/2014 | Backues et al. | |
| 2015/0066450 A1 | 3/2015 | Charlesworth et al. | |

* cited by examiner

COMPOSITIONS AND METHODS ASSOCIATED WITH INTERCALATING AND EXFOLIATING A SAMPLE

ORIGIN OF THE INVENTION

The invention described herein was made by employees of the United States Government and may be manufactured and used by or for the Government for Government purposes without the payment of any royalties thereon or therefor.

CROSS-REFERENCE TO RELATED APPLICATIONS

This application claims the benefit of U.S. Provisional Patent application Ser. No. 61/754,079 entitled "Methods for Intercalating and Exfoliating Hexagonal Boron Nitride," filed Jan. 18, 2013 and U.S. Nonprovisional patent application Ser. No. 14/158,080 entitled "Methods for Intercalating and Exfoliating Hexagonal Boron Nitride," filed on Jan. 17, 2014. The entirety of the above-noted applications are incorporated by reference herein.

BACKGROUND

The structural similarity between hexagonal boron nitride (hBN) and graphite is highlighted by the widespread use of term "white graphite" for boron nitride. This similarity has led to the efforts of using carbon chemistry and technology as guidance for research in boron nitride chemistry and technology. Such efforts resulted in the synthesis of cubic boron nitride (cBN) based on the structure of diamond, and boron nitride nanotubes (BNNT) based on the structure of carbon nanotubes.

On the other hand, the differences in chemical bonding between graphite and hBN lead to differences in the physical properties of the materials such as electrical conductivity and reactivity to air at high temperature. The ionic interlayer bonding in hBN is much stronger than the Van der Waal force between the graphite layers causing differences in the reactivity in intercalation. This also leads to differences in the efficiency of mass producing the respective exfoliated products for engineering purposes.

A layered material is "intercalated" when other chemicals are inserted into the layers, and a layered material is "exfoliated" when the layered structure split into thinner layers. Graphite can easily be intercalated, and then exfoliated by driving intercalates out of the layers quickly and/or explosively. The process of intercalation-exfoliation of graphite has been used in many engineering applications, such as fabrication of flexible graphite, or grafoil. Recently there are reports that intercalation-exfoliation has been used to split graphite into graphene in large quantities.

The similarity between carbon and boron nitride suggests the possibility that boron nitride can be easily intercalated and exfoliated as well. However, this is not the case. Starting from hBN instead of graphite, the above process to produce large quantity of exfoliated hBN or "white graphene" has not been successful. Intercalation of hBN is difficult. Alkali metals (Li, Na, and K) and fluorosulfate ($S_2O_6F_2$) are among the few intercalates that have previously been successfully intercalated into h-BN. It involves highly reactive chemicals and reactions. The feasibility of using these chemicals for mass producing exfoliated hBN or "white graphene" was not studied or discussed in these reports. The less reactive intercalates for graphite, such as metal chloride, have been found unreactive to hBN. Most notably among them is ferric chloride ($FeCl_3$). It is generally believed that intercalation of hBN with $FeCl_3$ in particular or metal chloride in general is not likely. For producing exfoliated hBN, the less efficient method of functionalization, sonication and centrifuge is commonly used. For "white graphene," plasma etching or micromechanical cleavage techniques have been used for minute quantities.

SUMMARY

The innovation disclosed and claimed herein, in one aspect thereof, comprises a method that facilitates exfoliation of a sample of a starting reactant, such as hexagonal boron nitride (hBN). In one embodiment, the method may include mixing the sample of the starting reactant with a selected set of chemicals (e.g., a metal chloride, etc.) and an activation agent (e.g., NaF, etc.). The set of chemicals are intercalated into the sample to obtain an intercalated sample. The intercalated sample is then exfoliated. The exfoliated sample can be washed (e.g., with HCl, etc.) to remove remaining nanoparticles. Additionally, such a method can include the acts of optionally hydrating the set of chemicals including water adsorption from ambient air, evaporating the set of dry or hydrated chemicals, converting the set of dry or hydrated chemicals to a set of oxide nanoparticles, etc. The process of intercalation-exfoliation of the sample results in a layered structured having sheets.

The particle size of the starting reactant may affect the physical properties of the resulting layered structure. For example, smaller particles of a sample of hBN may be better suited to create a product like white graphene because they are ultimately thinner. Conversely, some application may be better suited by larger particles. Thus, the starting reactant may be selected based on the desired product.

In another embodiment, the set of chemicals for mixing may be selected such that an activation agent is unnecessary. For example, the set of chemicals may comprise aluminum chloride containing some water absorbed from ambient air, $AlCl_3$ containing $H_2O$, making an activation agent unnecessary/undesirable if surface intercalation without bulk intercalation is the goal. Another example, the set of chemicals may comprise aluminum chloride, AlCl3, making an activating agent unnecessary if the starting reactant is exfoliated hBN where the exfoliated layers are separated by $Fe_2O_3$ nanoparticles. Using the set of chemicals without an activation agent may change the intercalation process (e.g., limiting intercalating at sample surface, additional wait time for intercalation, operate at a different temperatures, etc.).

In another embodiment, more activation agent would be mixed with the sample of starting reactant and the set of chemicals. For example, the ratio of the activation agent may be increased relative to the starting reactant, hBN. This may increase the space between the individual sheets of sample material resulting from the sample exfoliation. Furthermore, different activation agents may yield more or less exfoliation. Varying the amount exfoliation changes the physical properties of the sheets of the layered structure. In another embodiment, different kinds of activation agent may mixed with the sample of starting reactant and the set of chemicals. For example, instead of NaF, LiF and KF can also be used to activate hBN intercalation. In terms of activating power, NaF is stronger than LiF, but not as strong as KF.

In another embodiment, the method may include mixing the sample of the starting reactant with a selected set of chemicals, an activation agent, as well as inert materials. After the intercalation-exfoliation process, the inert material is present between the individual sheets of sample material. For example, the inert substance may be titanium dioxide, which has a high dielectric constant. Accordingly, the resulting layer structure would have a high dielectric constant. Thus, an inert material may be added to the layered structure to change its physical properties.

In other embodiments, the subject innovation can comprise exfoliated sample, or one or more intermediate products obtainable during methods of creating the exfoliated sample, such as an exfoliated sample having metal oxide nanoparticles. In other aspects, the subject innovation can comprise ceramic composite compositions and/or articles created from such intermediate products (e.g., from the exfoliated sample with metal oxide nanoparticles). In another embodiment, the intercalation-exfoliation can be repeated multiple times to make the sheets of the layered structure thinner and thinner.

The example methods described relate to hBN. However, different starting reactants may be used. For example, boron nitride nanotubes (BNNT) may be used as the starting material instead of hBN. When the BNNT is exfoliated the nanotubes have the dimensions of stings, which may be desired for a particular property. Accordingly, the starting reactant may be selected to create a product having specific properties.

These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
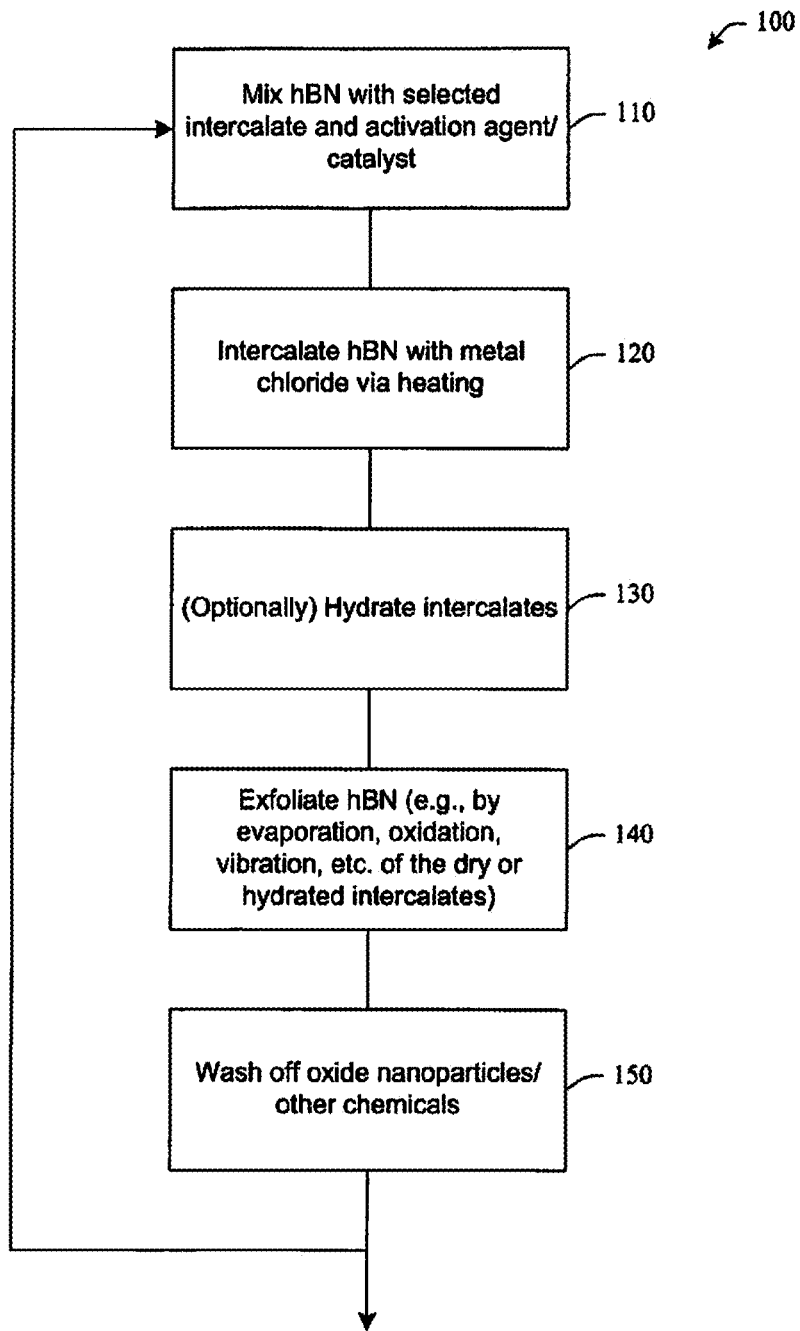
FIG. 1 illustrates a method that can facilitate intercalation and exfoliation of hexagonal boron nitride (hBN) in accordance with aspects of the subject innovation.

The innovation is now described with reference to the drawings, wherein like reference numerals are used to refer to like elements throughout the document. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As described above, the articles and method described herein relate to exfoliation of a sample of a starting reactant to create a layered structure comprised of sheets. Some of the examples herein describe the starting reactant to be hexagonal boron nitride (hBN). However, different starting reactants may be used. For example, the starting reactant may be boron nitride nanotubes (BNNT) instead of hBN. Therefore, while the embodiments discussed herein may refer to hBN, these embodiments may instead use an alternative starting reactant. As will be discussed, the starting reactant may be selected based on the desired physical properties of the layered structure.

Turning to FIG. 1, in various embodiments, the subject innovation can comprise a method 100 that can facilitate intercalation and exfoliation of hBN. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

Method 100 can begin at 110 by creating a mixture of hexagonal boron nitride (hBN) with a selected set of chemicals for intercalation (e.g., a metal chloride, etc.) and an activation agent/catalyst (e.g., NaF, S, etc.). At 120, the selected chemicals can be intercalated into the hBN, for example by heating them in an inert environment (e.g., pure $N_2$, etc.) for a first period of time according to a first heating pattern or histogram (example temperatures and heating times are provided in connection with experiments discussed below). At optional act 130, the intercalates can be hydrated, for example, by placing the intercalated product in a high humidity environment. At 140, the hBN intercalated with dry or hydrated chemicals can be exfoliated, for example by rapid heating in air for a second period of time according to a first heating pattern or histogram (again, examples are discussed below), or by sonication, or a combination thereof. In various embodiments, the subject innovation can comprise the material produced after any of 120, 130 or 140, or articles made thereof, such as ceramic composites made of the exfoliated hBN with metal oxide nanoparticles after act 140 (e.g., by hot pressing exfoliated hBN with metal oxide nanoparticles (e.g., $Al_2O_3$, etc.) at around 2000° C., etc.). Optionally, at 150, the oxide nanoparticles can be washed off of the exfoliated hBN (e.g., with HCl, etc.). The process can be repeated one or more times for additional exfoliation. In some embodiments, the subject innovation can comprise exfoliated hBN (e.g., as obtained via method 100, etc.).

Figure 2:
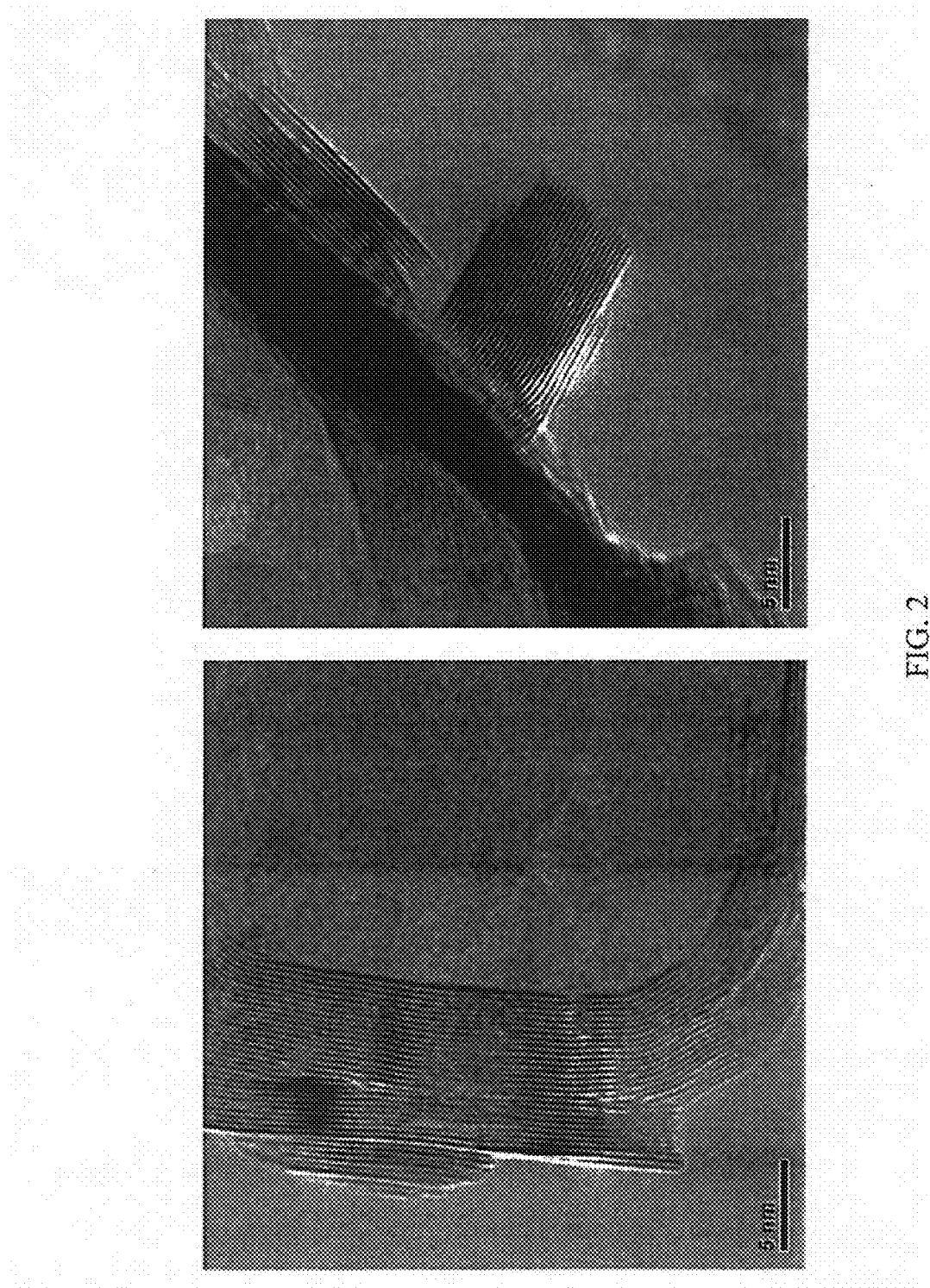
FIG. 2 shows a pair of transmission electron microscopy images of an exfoliated boron nitride nanotube (BNNT) that resulted from removing iron nanoparticles and other impurities from BNNT during purification.

While hexagonal boron nitride (hBN) exfoliation by way of intercalation with metal chloride has not been previously successful, the subject innovation builds upon recent efforts in boron nitride nanotechnology to accomplish exfoliation of hBN via intercalation of metal chlorides. FIG. 2 shows a pair of transmission electron microscopy images of an exfoliated boron nitride nanotube (BNNT) that resulted from removing iron nanoparticles and other impurities from BNNT during purification. Also, although BNNT cannot be intercalated by direct exposure to molten $FeCl_3$, the wetting and cleaning effects of BNNT by $FeCl_3$ have been observed. In addition, BNNT intercalated with potassium and then exfoliated by reacting to water has been successfully demonstrated. This led to a hypothesis leading in part to the subject innovation that, if hBN may be chemically activated similar to BNNT, intercalation of hBN with $FeCl_3$ and subsequent exfoliation may be possible. This hypothesis is in parallel with the experience in carbon intercalation: Some of the graphite intercalation reactions need to be "activated" in order to proceed. For example, iodine cannot be intercalated with graphite unless graphite is "activated" by bromine or HBr.

The subject innovation, in various embodiments, includes methods that can facilitate intercalation and exfoliation of hBN. In other embodiments, the subject innovation includes intermediate products that can be associated with such methods, or articles (e.g., ceramic, composite, etc.) comprising or derived from such intermediate products.

In one embodiment, confirmed through results discussed herein, sodium fluoride (NaF) can be used as a catalyst to successfully intercalate $FeCl_3$ into hexagonal boron nitride (hBN). This reaction, as discussed herein, caused the hBN mass to increase by about 100%, the lattice parameter c to decrease from 6.6585 to 6.6565-6.6569 Å, the x-ray diffraction (002) peak to widen from 0.01 to 0.05° full width half max (FWHM) value, the FT-IR's (Fourier transform infrared spectroscopy) broad band (peaked at 1277 $cm^{-1}$) to change shapes, and new FT-IR bands at 2700-3700 and 1600 $cm^{-1}$ to emerge. This indicates the hBN's structural and chemical properties are significantly changed. The intercalated product was hygroscopic. The moisture picked up from air interacted with intercalated $FeCl_3$, causing further structural and chemical property changes (XRD and FT-IR data). During a 24 hours hold at room temperature with 100% relative humidity air exposure, the mass increased another 141%. All of the above changes were nearly completely reversed after the product was placed in HCl to remove the intercalated $FeCl_3$, indicating the hBN layers were not significantly damaged during the process. The intercalated product, with or without hydration, was heated to 750° C. air to cause exfoliation. The extent of exfoliation was low after one cycle of intercalation-air heating, but became significant during the $2^{nd}$ cycle, after which 20 nm nanosheets were commonly found.

Methods of the subject innovation can involve reactions based on interactions between hBN and metal chlorides, such as the following examples involving iron chloride ($FeCl_3$):

(1)
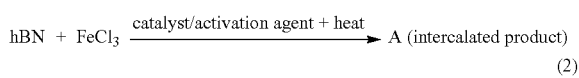

(2)
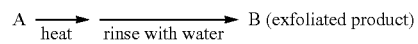

The chemical reaction experiments employed in the subject innovation for possible intercalation reactions has similarities to those described in previous reports, however, embodiments of the subject innovation can add a catalyst/ activating agent such as sodium fluoride (NaF) to the original reactants. Sodium fluoride was considered as a possible catalyst/activating agent for intercalation because its aqueous solution with HCl has been previously observed to attack/activate BNNT. The products of these chemical reactions (A and B) were then further examined for the evidences of intercalation and exfoliation.

In various embodiments, the processes of intercalation and exfoliation described above (or similar processes, e.g., with other metal chlorides, catalysts, etc.) can be repeated in order to see if the additional effort would cause further exfoliation. That is,

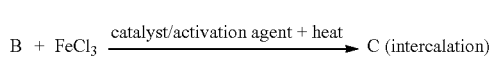
(3)

$$B + FeCl_3 \xrightarrow{\text{catalyst/activation agent + heat}} C \text{ (intercalation)}$$

$$C \xrightarrow{\text{heat}} D \text{ (exfoliation)} \quad (4)$$

In various embodiments, the products "A" to "D" can be further treated chemically as follows:

(a) The intercalated and exfoliated products were rinsed with hydrochloric acid (HCl) at room temperature to remove impurities and intercalates:

$$A, B, C, \text{ or } D \xrightarrow{\text{HCl}} E \quad (5)$$

(b) The intercalated products ("A" or "C") can be exposed to room temperature moist air for a period of time; during experiments such results were characterized several times during this period to study the water-adsorbing characteristics of the apparently hygroscopic intercalated product:

$$A \text{ or } C \xrightarrow{\text{wet air}} A' \text{ or } C' \text{ (hydration)} \quad (6)$$

(c) The hydrated products can be placed into a high temperature furnace or otherwise exposed to rapid heating for the moisture to quickly boil, whereby the adsorbed moisture can provide additional driving force of exfoliation:

$$A' \text{ or } C' \xrightarrow{\text{heat}} \xrightarrow{\text{rinse with water}} B' \text{ or } D' \text{ (hydration)} \quad (7)$$

(d) In further results, the intercalated products "A" were stored in dry air for four months and characterized twice during this period to determine the stability of the intercalated product in dry air.

Two different kinds of commercially available hBN powder were used in experiments discussed herein. The larger ones were platelets mostly 20-80 μm wide and 5-10 μm thick. The smaller ones were mostly 200-800 nm wide 80-200 nm thick. Both of them are well crystallized, as indicated by their significant XRD (X-ray diffraction) peaks for hBN.

A first set of experiments involved intercalation with ferric chloride ($FeCl_3$). Ferric chloride ($FeCl_3$) (98%) and NaF (99.98%) used in the experiments were commercially purchased from Alfa Aesar. NaF was used as purchased. $FeCl_3$, on the other hand, was distilled once immediately before being used in intercalation reaction because it is highly hygroscopic. Its melting point and boiling point are 306° C. and 315° C., respectively. When it evaporates/sublimates, a fraction simultaneously decomposes into $FeCl_2$ and $Cl_2$. For distillation conducted in this research, it was sublimated/evaporated at about 260-330° C. and then condensed at about 30° C. lower. Based on the vapor pressure and decomposition equations for $FeCl_3$, the vapor pressure of for $Cl_2$ during distillation was 4.4 Torr at 260° C. and 72 Torr at 330° C. The $FeCl_3$ pressure was 51 Torr at 260° C. and 688 Torr at 330° C. under the system of 1 atmosphere total pressure.

The detailed experimental procedures were as follows: Pre-calculated quantities of hBN, distilled $FeCl_3$ and NaF were weighed and mixed into a 50 ml test tube. The test tube was sealed using PTFE (polytetrafluoroethylene) tape, and then placed into a 500 ml reactor kettle, which is then sealed air-tight. Pure nitrogen was then allowed to flow through valves into and out of the kettle to purge air and keep the system in an inert environment during the entire reaction period. The sample at the bottom of the test tube was heated to a temperature slightly below the melting point of $FeCl_3$ (306° C.) for intercalation, and eventually to a temperature slightly above the boiling point of $FeCl_3$ (315° C.) for letting the excess $FeCl_3$ boil and leave the product from the bottom of the test tube and then condense at the top of the tube where the temperature is lower due to the lighter thermal insulation. After the reaction and the system cooled, the product was removed from the test tube and stored in dry environment. Results of the procedure described in this paragraph were products "A" or "C" described above.

Samples of the product "A" were then placed in a quartz watch glass, weighed and placed into a furnace heated to 600-750° C. for a period ranged from 2 to 4 hours using a pre-programmed temperature histogram. After heating, the product was removed from the furnace, cooled and rinsed with water. The result was product "B" described above. This product was then further treated for intercalation according to the procedure described above to have product "C". In this research, some but not all of the products "C" was exposed to moist air, either at ambient humidity or at 100% relative humidity. In all cases, it was then placed in a quartz watch glass, weighed and put into a furnace heated to 600-750° C. for a period ranging from 2 to 4 hours using a pre-programmed temperature histogram, to result in "D".

Concentrated (35 wt %) HCl was used to remove intercalates. Detailed reactant and product mass data and temperature histogram of the experimental runs used for this report are described in Table 1:

TABLE 1

A summary of the intercalation of the as-purchased commercial hBN with FeCl₃.

| Reactants * | | | Reaction temperature during 2 or 3 steps of sequential heating in nitrogen Temperature (° C.)/duration (hr) | | | Products ** | |
|---|---|---|---|---|---|---|---|
| Type of hBN | Mass ratio NaF To hBN | # FeCl₃ to hBN | | | | hBN mass content (%) | Label ## |
| L | 0.120 | 2.7 | 315/12 | 340/2 | — | 55 | A1 |
| L | 0.141 | 2.8 | 320/23 | 340/19 | — | 45 | A2 |
| L | 0.115 | 2.3 | 290/14 | 320/30 | 355/16 | 54 | A3 |
| L | 0.190 | 1.7 | 240/25 | 285/22 | 330/21 | 42 | A4 |
| S | 0.14 | 2.7 | 290/3 | 330/38 | — | 45 | A5 |

\* The reactants were hBN, NaF and excess amount of ferric chloride. hBN type: L: large 20-80 μm wide 5-10 μm thick. S: small 200-800 nm wide 80-200 nm thick
\*\* The intercalated products were not washed. They included hBN, the intercalated chemicals, FeOCl and NaCl. The presence of NaCl and the absence of NaF or fluorine atoms were confirmed by XRD and EDS data.
Boiling point of FeCl₃ is 315° C.. At this temperature, the iron chloride vapor is in the dimer form and is partially decomposed to gaseous Cl₂ and solid FeCl₂. At one atmosphere under this condition, the equilibrium partial pressure for Fe₂Cl₆ and Cl₂ are 718 mmHg and 42 mmHg, respectively.
The labels used to identify the products described herein.

For hydration (reaction (6), above), the products A or C were placed on a glass slide and exposed to ambient air with known humidity, or to an enclosed container containing liquid water for 100% relative humidity.

The samples were characterized using Fourier transform infrared spectroscopy (FT-IR), x-ray diffraction (XRD) and field emission scanning electron microscopy (FeSEM).

An Agilent Cary 660 FT-IR with attenuated total reflectance (ATR) accessory was used to characterize IR bands near 1380 and 755 cm$^{-1}$ for boron nitride in the products.

A Bruker D8 Advance X-Ray Diffractometer was used to find x-ray diffraction peaks for hBN and identify the impurities in the products. The samples were normally scanned at 0.02° (2θ value) per step unless otherwise stated when extra precision was required (0.005° per step in that case). The full width at half maximum (FWHM) values as the peak width for hBN's (002) were calculated using the split-Pearson VII empirical fitting function. The (004), (006), and in some cases (008) peaks for hBN were used to accurately calculate the "c" lattice parameter using the fundamental parameters approach and the Pawley fitting method as implemented in the Bruker TOPAS software program. It is therefore a sensitive method to evaluate the state of intercalation. Non-hygroscopic samples, typically 10 mg in mass, were mounted as a thin layer on a flat "zero" background holder (ZBH), which consisted of a polished silicon wafer cut on a non-diffracting, high-index plane. Hygroscopic intercalated samples were mounted in a 0.5 mm-deep well ZBH holder. The iron and chlorine concentrations for those samples were such that their x-ray penetration depths (95% contribution to the diffracted beam) were typically near 60 μm. Under these conditions, the FWHM values were not affected by the thickness of the samples being scanned.

A Hitachi S-4700II field emission scanning electron microscope (FeSEM) was used to study the morphology throughout the reactions studied in experiments discussed herein. Energy dispersive spectrum (EDS) was used to identify the chemical elements in the products.

The large hBN platelets (mostly 20-80 μm wide 5-10 μm thick) were highly crystalline as seen by sharp and intense XRD peaks. Once intercalated, their layered lattice structure change, with their XRD peaks becoming lower and wider, and their lattice parameters, especially the c parameter which is a measure of the interlayer spacing, will also change. Observation of lattice structure changes at hBN's interior some distance away from the surface, at the reaction temperature of 240-360° C., signals that the chemicals surrounding the platelets may have entered to the interior (i.e., intercalated).

Figure 3:
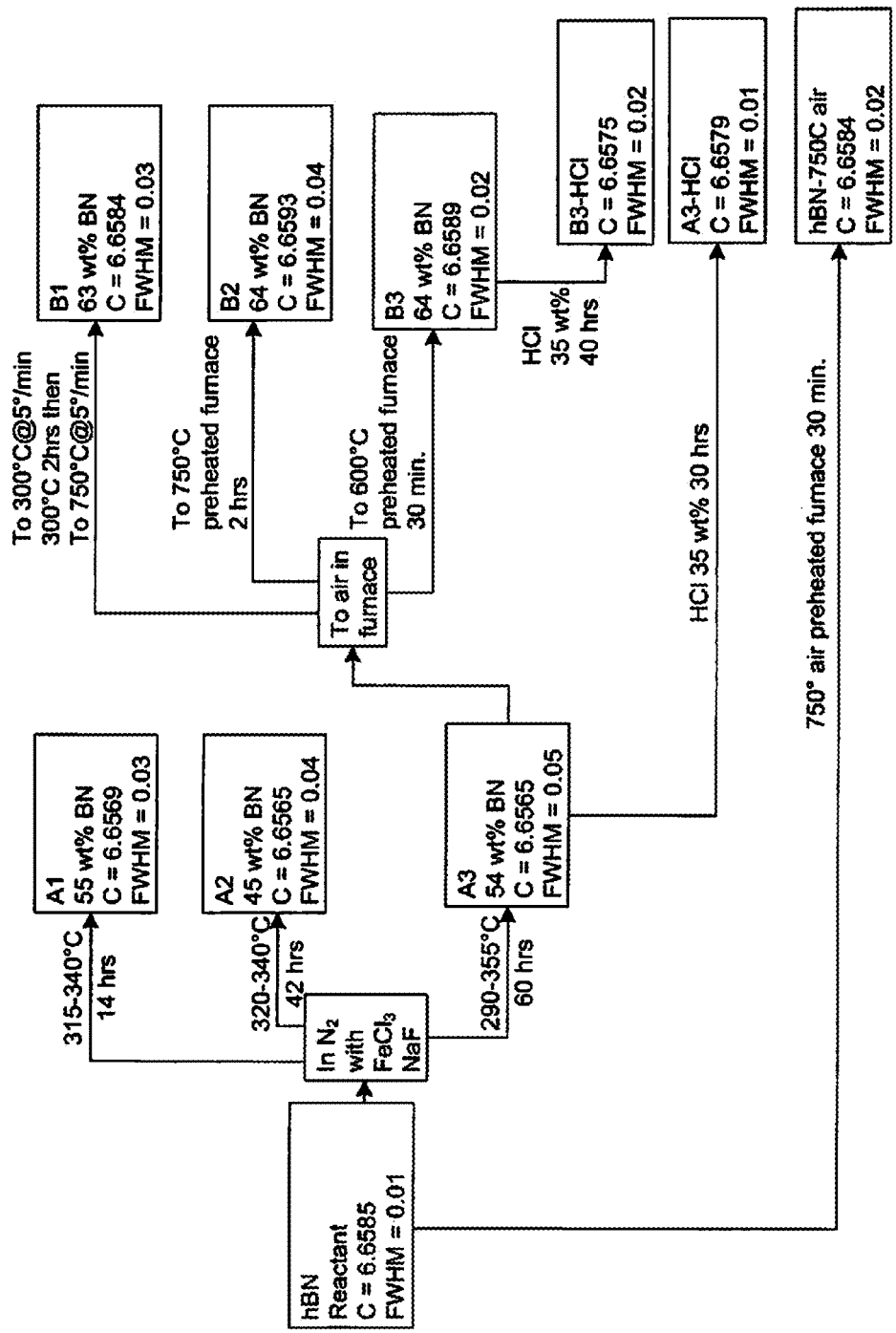
FIG. 3 illustrates examples of intercalation and exfoliation reactions involving $FeCl_3$ that were examined in experiments described herein.

FIG. 3 shows examples of intercalation and exfoliation reactions involving FeCl₃ that were examined in experiments described herein. Changes of hBN's (002) peak width (°) and the c parameters (Å) during the reactions suggest the intercalates were in the layers of hBN. The chart in FIG. 3 the experiments conducted in connection with the FeCl₃ results where large hBN platelets were intercalated and exfoliated for the first time. The hBN's (002) peak width (FWHM) and the c parameters for the hBN reactant and all intermediate and final products are also included. The precision of the FWHM was estimated to be in the range of ±0.01° based on observation of sample repetitions. This is compared to the 0.01-0.05° of the FWHM values and 0.02° scanning step value during data collection. The lattice parameter data was based on analysis of (004) and (006) peaks. The accuracy and precision was estimated to be in the range of ±0.0005 Å based on observation of sample repetitions and comparison to results with an internal standard. Even though the analysis program generates estimated standard deviations for the lattice parameter results, it is well known that the estimated standard deviation can be over an order of magnitude smaller than the true error. Therefore, the above estimation of error, which is more conservative, is included. After reacting to FeCl₃ and NaF, changes in hBN's lattice structures were observed. These changes, however, were mostly restored after the final rinse by 35 wt % HCl to result in pure, exfoliated hBN. According to the reasoning described above, this result indicates that the hBN was most likely intercalated, and mostly if not completely deintercalated to become a thinner product having lattice structure similar to the original reactant, as HCl removed all intercalates.

The (002) peak width, as expected, became wider because intercalation introduced disorder into the lattice. Potential explanations of the changes of c parameter (and therefore the interplanar spacings between the BN layers) were not investigated. It was slightly decreased during intercalation, then increased to a value slightly larger than the original hBN reactant during exfoliation in 750° C. air, and eventually returned to the original hBN value after HCl treatment.

FeCl₃ intercalation also causes interplanar spacings between graphite layers to change. The changes, however, are small and only between graphite layers adjacent to the intercalate layer.

The similarity between the hBN reactant and its intercalated-then-deintercalated product (B3-HCl in FIG. 3) observed here indicates that most if not all intercalates in the hBN layers were removed. This phenomenon is very different from graphite. Completely removing intercalate from graphite layers it is very difficult. The "residue compound" left after the incomplete deintercalation of graphite exhibits XRD peak widths and c parameters generally larger than their precursor. Another difference between graphite and hBN intercalation is the lack of staging phenomenon for hBN. In graphite, there are a certain number (n) of carbon layers between two intercalate layers. The regular insertion of intercalate layers into graphite results in a "stage n intercalated product" and new intercalation peaks for XRD. In hBN, the intercalate insertion seems to be random, as no new XRD peaks can be accounted for as "intercalation peaks."

Figure 4:
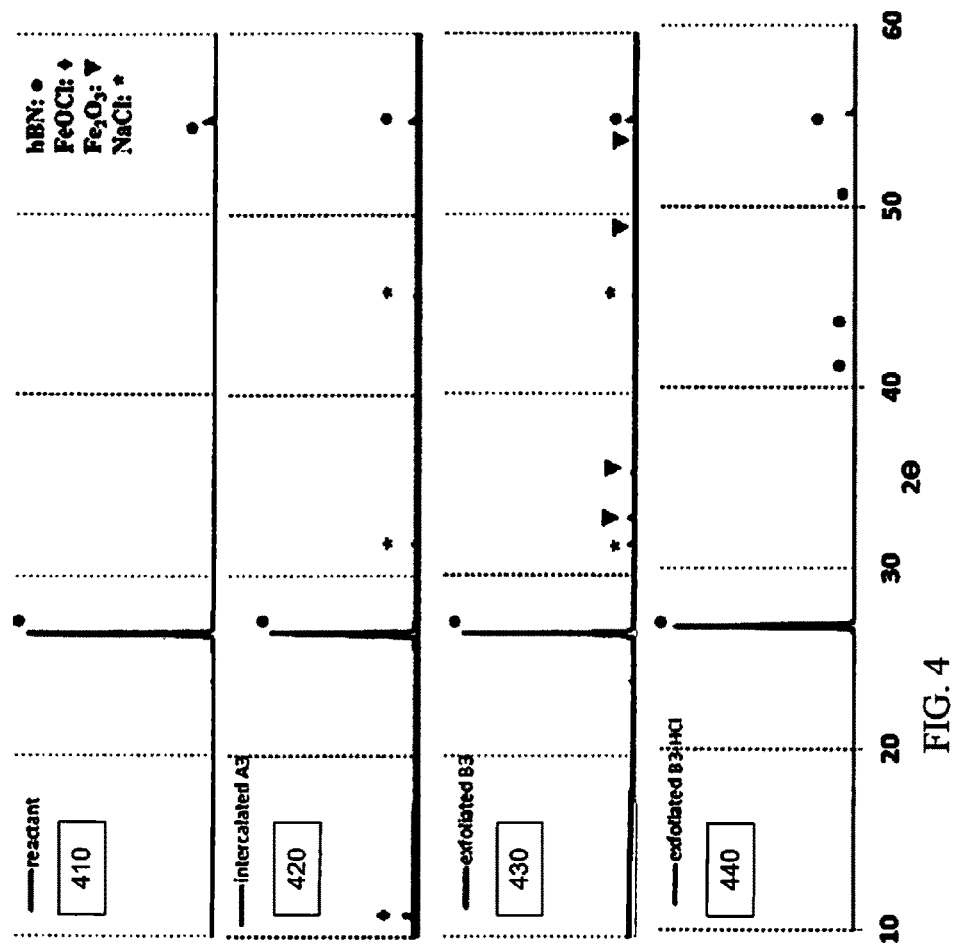
FIG. 4 illustrates X-ray diffraction (XRD) scans of hBN reactant, and products described in FIG. 3.
Figure 4:
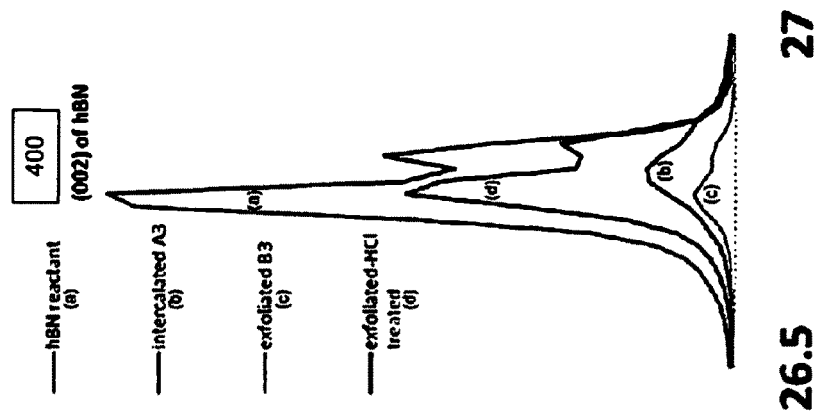

FIG. 4 illustrates XRD scans of hBN reactant, and A3, B3, and B3-HCl (as described in FIG. 3). Even though the very large (002) peaks were obtained, analyzing the implications of this XRD peak heights (or its total integrated intensity) is complicated because measured peak values are affected by many parameters, some of which are either not well known or difficult to control, such as chemical composition and preferred orientation of the samples being measured. Consequently, the XRD peak height were not closely examined other than the general observations that hBN's (002) peak heights were reduced during intercalation, and were mostly restored after the subsequent exfoliation reactions by 750° C. air and cleaning by HCl. This is illustrated in 400, which shows the relative heights of (002) peaks from thin samples of hBN reactant, A3, B3 and B3-HCl described in FIG. 3. The full XRD scans of these four samples are shown in 410, 420, 430, and 440. In these figures, no chemicals other than hBN were detected in the original hBN and the final product after HCl cleaning (B3-HCl in FIG. 3). In the intercalated sample (410), the major intercalate (iron chlorides) are not visible and are believed to be amorphous, but small impurity peaks of FeOCl and NaCl were detected. After the intercalated samples were heated in 750° C. air, $Fe_2O_3$ (major intercalate) and NaCl were detected in 420. The presence of NaCl in A3 and B3 is believed to be the result of reactions of NaF and $FeCl_3$ at the environment of the intercalation reaction. The presence of FeOCl in A3 is caused by a trace of oxygen in the reaction system. The oxygen may come from water that remained in the once-distilled $FeCl_3$. It may also come from the reaction between NaF and the glass container. The presence of $Fe_2O_3$ is believed to be the oxidation product from $FeCl_3$ and FeOCl.

Hexagonal boron nitride is much less reactive than the intercalates which are generally more chemically reactive. By inserting reactive chemicals into the hBN layers, the atoms/molecules of the intercalated will be brought to the proximity of individual hBN layers, and the chemical properties of hBN may be affected. The possible changes of hBN's chemical properties can be probed by examining the FT-IR data.

Figure 5:
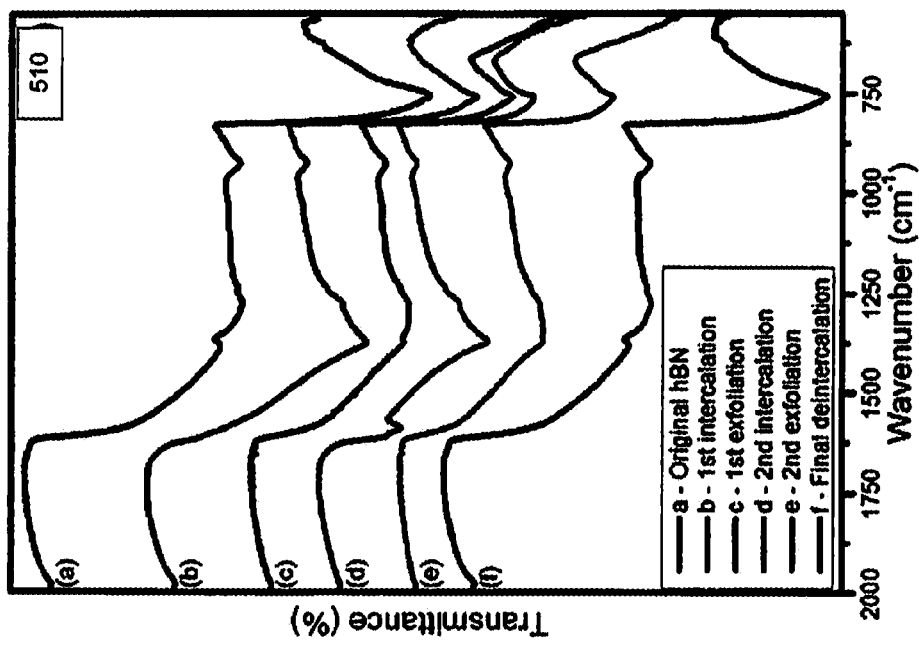
FIG. 5 illustrates changes of the Fourier transform infrared spectroscopy (FTIR) peaks from hBN to intercalation, exfoliation, and deintercalation.
Figure 5:
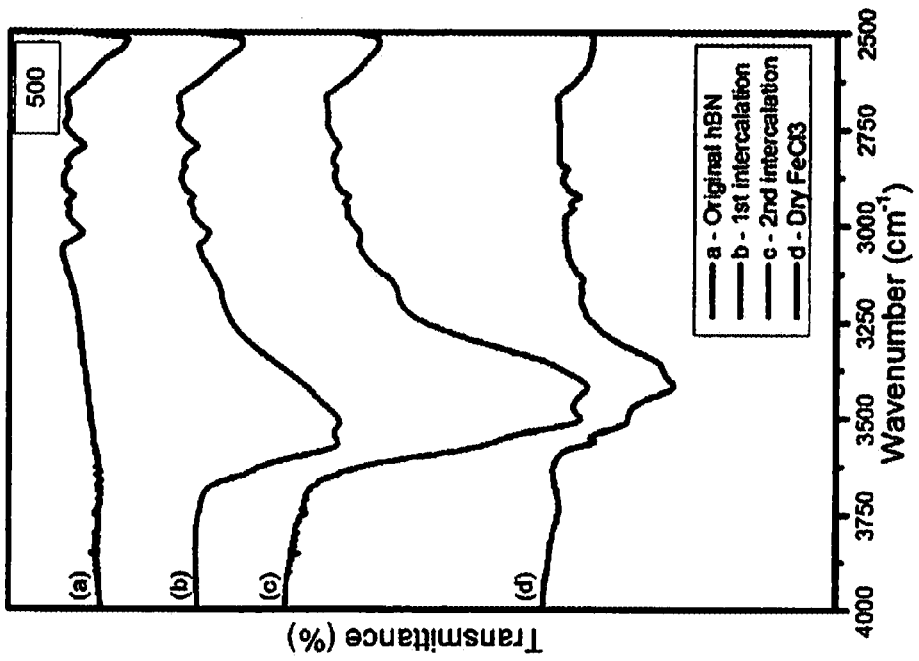

FIG. 5 illustrates changes of the FTIR peaks from hBN to intercalation, exfoliation, and deintercalation. For h-BN, there are two characteristic peaks: a relatively broad band 1700-900 $cm^{-1}$, and a relatively narrow band 850-700 $cm^{-1}$, which are associated with the in-plane B—N bond stretching vibration and the out-of-plane B—N—B bending vibration, respectively. The hBN FTIR results used in these experiments and discussed herein are consistent with this data, as seen in the curve at 500. After reacting with $FeCl_3$, the product has large and new broad FT-IR bands at 3050 to 3700 $cm^{-1}$ range which includes double bands at 3480 and 3555 $cm^{-1}$.

Graph 500 compares FT-IR of the original hBN (curve a), intercalated hBN containing $FeCl_3$ (curve b) and the pure $FeCl_3$ (curve c) at the broad bands wavenumber range (3000-3800 $cm^{-1}$). The original hBN does not have a band in this range, but the other two do. The broad band from the intercalated product is therefore thought to be the band from $FeCl_3$. However, these bands (curve b) positions and shapes were different from the pure $FeCl_3$ (curve c). The FT-IR differences between pure $FeCl_3$ and intercalated $FeCl_3$ indicate the intercalated $FeCl_3$ is affected by hBN. In other words, there are interactions between hBN and $FeCl_3$.

Graph 510 is the FT-IR data in 500-2000 $cm^{-1}$ region. It shows the shape changes of the broad hBN bands during the entire process. That is, from the original hBN reactant (curve a) it was sequentially treated by heating in a $FeCl_3$—NaF mixture for intercalation (curve b), heating in 750° C. air for exfoliation followed by rinsing in deionized water to removing NaCl (curve c), heating in $FeCl_3$—NaF mixture again for intercalation the $2^{nd}$ time (curve d), heating in 750° C. air for exfoliation followed by deionized water rinse for removing NaCl the $2^{nd}$ time (curve e), and finally placing in 35 wt % HCl to remove the intercalates (curve f).

For the broad 1700-900 $cm^{-1}$ band, its shapes changed during the intercalation-oxidation-deintercalation process. Peak position of this band shifted from 1277 to 1383 $cm^{-1}$ during the process (510, curve b, c, d and e), but returned to the original 1277 $cm^{-1}$ after all intercalates are removed (510, curve f). Changes of the 850-700 $cm^{-1}$ band, on the other hand, remained in the narrow 755 to 760 $cm^{-1}$ range. This suggests a change of the B—N stretching vibration, but not much change of the B—N—B bending vibration.

In addition to the above-described bands, new FT-IR peaks at about 1600 $cm^{-1}$ are observed in the intercalated samples (510, curves b and d). A close look shows they are double-peaks. One of the peaks was from the intercalate ($FeCl_3$), described in more detail below. The other peak is believed to be due to stretching in the direction comparable to BNNT's tangential stretching vibration. It is noted that such a peak does not show up in regular hBN, but is evident in BNNT because the tube curvature induces a strain on the hBN network. The observation of this band in the hBN sample here suggests strain on the hBN, which is possibility due to intercalates present in the hBN network. The band near 500 $cm^{-1}$ was believed to be from $Fe_2O_3$, which resulted from oxidation of $FeCl_3$.

Similar to the XRD data, all the changes of the FT-IR data during the process were almost completely reversed, and the peaks returned to its original shape after the final HCl treatment in which the intercalates and other impurities were removed.

The overall changes of the hBN's vibration modes during the entire process indicates interactions between hBN and intercalate (hBN-$FeCl_3$ or hBN-$Fe_2O_3$) result in changes of hBN's chemical properties, and such changes can be reversed by removing the intercalates.

The mass ratio of the original reactant mixture was hBN:$FeCl_3$:NaF≈1:2:0.2. After heating the mixture of hBN (large platelets), $FeCl_3$ and NaF and then boiling off excess $FeCl_3$, the as-synthesized products were brown in color and had a mass gain over the original hBN by about 100%. Energy dispersive spectrum (EDS) obtained from SEM operated at 15 kV indicated that the overall mole ratio of Fe:Cl:Na for this as-synthesized product was about 1:2.8:0.45. It was noted that EDS cannot detect fluorine, which was in the original reactant in the form of NaF.

The significance of NaF in the reaction was observed when comparing the above mass data to those in preliminary experiments where the same heating and boiling process was conducted without the presence of NaF. In those cases, the as-made products were white in color and had mass gain over the original hBN by less than 10%.

Figure 6A:
FIGS. 6A-B illustrate field emission scanning electron microscope (FESEM) images of hBN platelets with ferric chloride intercalate.
Figure 6B:

FIG. 6A shows an FeSEM photo of the as-synthesized product. FIG. 6 shows the same image of hBN platelets, except the SEM detected backscattered electrons, which highlights heavy element (iron) as bright areas. When comparing these two pictures, it is seen that iron is more concentrated at the sides and edges of the disk-shaped particles. This data suggest that the mass increases during the reactions resulted from $FeCl_3$ entering the layered structures of the hBN from the side.

Figure 7A:
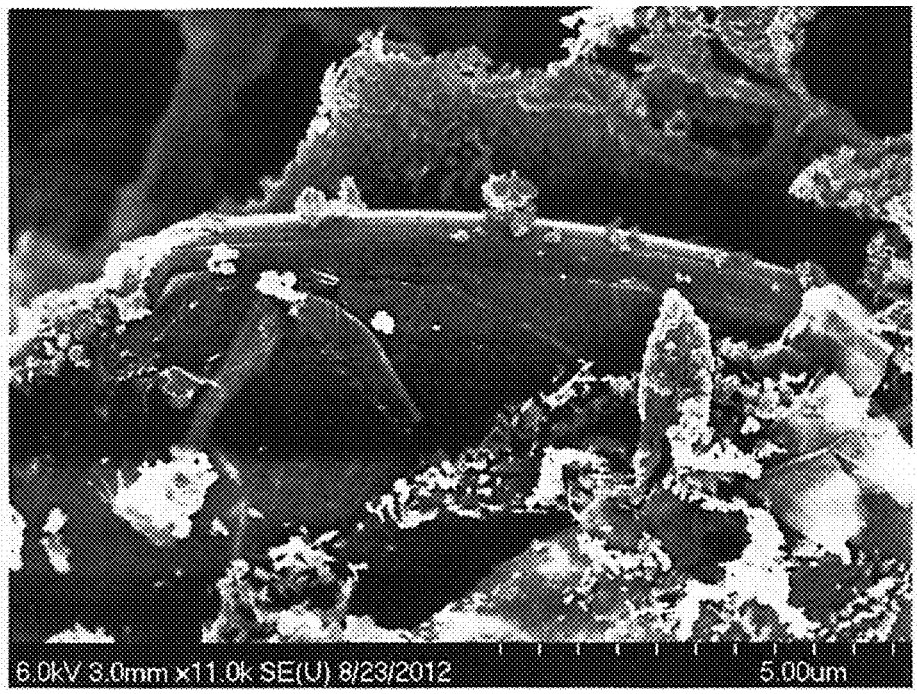
FIGS. 7A-B illustrate SEM pictures of an intercalated sample after it was slowly oxidized by oxygen in air at high temperature to become $Fe_2O_3$ nanoparticles.
Figure 7B:
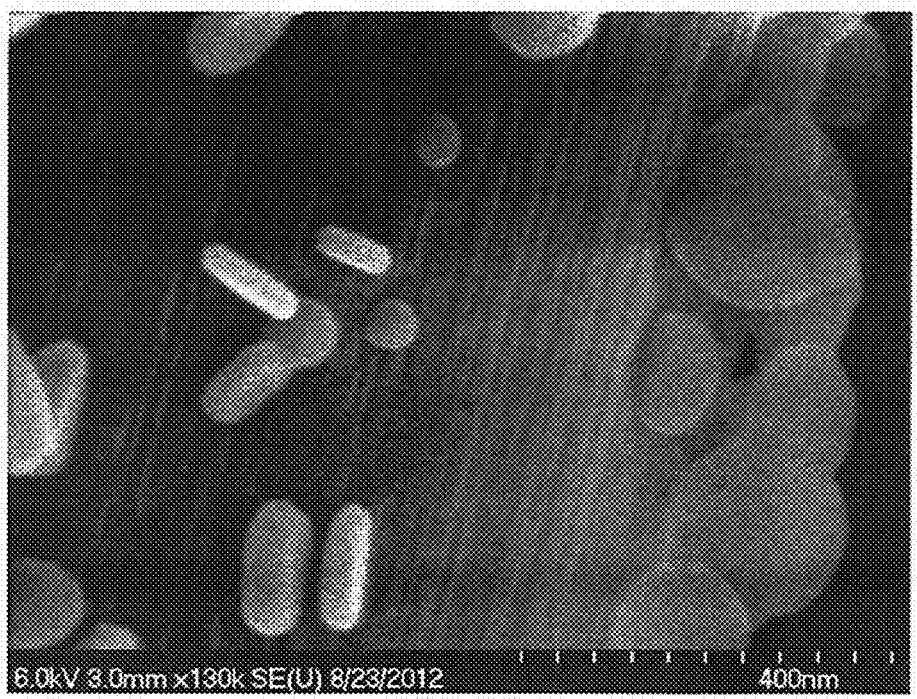

FIGS. 7A-7B are SEM pictures of the above intercalated sample after it was slowly oxidized by oxygen in air at high temperature to become $Fe_2O_3$ nanoparticles (e.g., B1 in FIG. 3). The heating rate was 5° C. per minute from room temperature to 750° C. with a holding time of 2 hours at 300° C. It was sufficiently slow so that the iron chloride intercalate were in solid phase and did not change location when they became $Fe_2O_3$. The presence of $Fe_2O_3$ in the sample was confirmed by XRD. FIG. 7A shows top view of alternating layers of hBN and $Fe_2O_3$ nanoparticles. FIG. 7B is the side view of a relatively thick hBN layer about 1 μm thick. It can be seen that this layer is split into numerous thin layers about 20-30 nm thick. Both pictures suggest that hBN was intercalated with the nanoparticle's precursor (i.e., iron chloride).

Figure 8A:
FIGS. 8A-B illustrate SEM pictures of an intercalated sample after it was quickly oxidized by oxygen in air at high temperature.
Figure 8B:
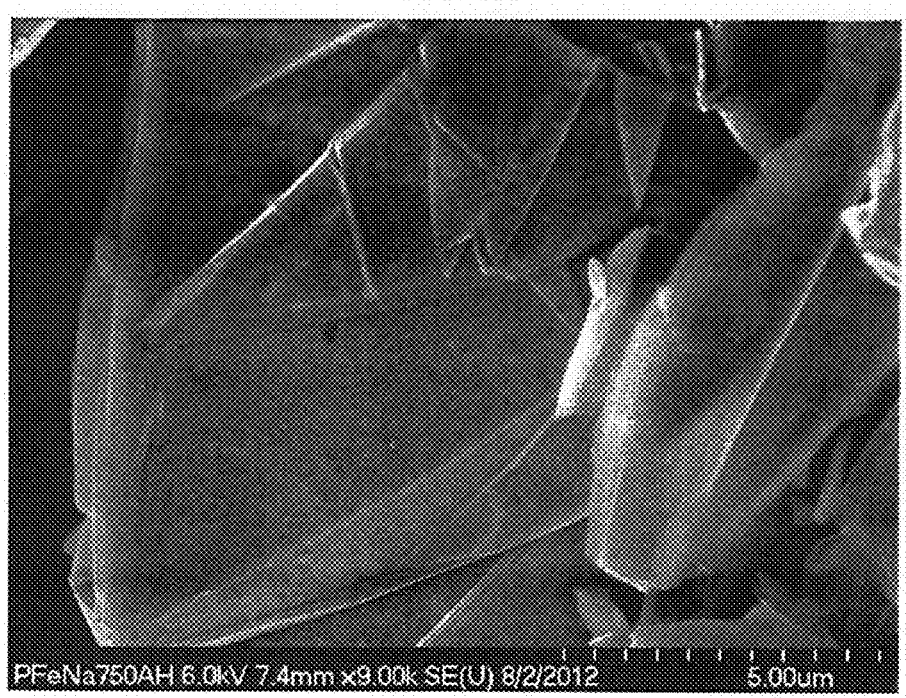

FIG. 8A is SEM photo from a sample similar to FIGS. 7A-7B, except this intercalated sample was quickly oxidized by placing it into the preheated 750° C. furnace (e.g., B2 in FIG. 3). The fewer but much larger, micron-sized $Fe_2O_3$ particles are believed to be the result that some $FeCl_3$ intercalates melt, coagulated, moved out of the lattice, and then oxidized. This sample also shows intercalation and a limited degree of exfoliation. FIG. 8B is a picture of exfoliated hBN in this sample.

The above pictures show signs that, using NaF as catalyst/activating agent, hBN was indeed intercalated with $FeCl_3$. Furthermore, subsequent heating of this intercalated product in air at 750° C. appeared to result in some degree of exfoliation. However, the exfoliation shown in both FIG. 6B and FIG. 7B was the minority among a large number of platelets in the samples. Although 20 nm exfoliation thicknesses were found, some platelets were not exfoliated, and the thicknesses of most of the exfoliated hBN platelets were in 0.5 to 2 μm range. Nevertheless, the resulting platelets were overall thinner than the original hBN reactant platelets (mostly more than 5 μm thick), but far from the goal of fabricating "white graphene." For the purpose of generating further exfoliation, reactions (3) to (7) described earlier in this report were carried out via two different techniques.

Figure 9A:
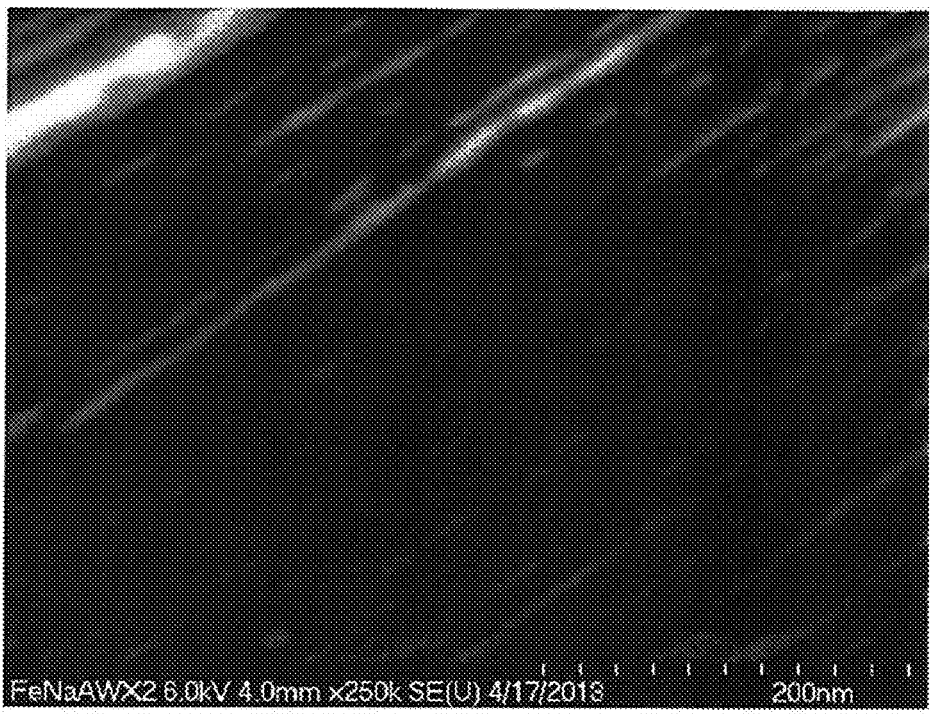
FIGS. 9A-B illustrate SEM images of exfoliated hBN nanosheets.

In the first technique, the intercalated and then air-heated product (hBN containing micron-sized $Fe_2O_3$ particles described in connection with FIGS. 8A-8B) was rinsed with water to remove its sodium content (EDS data), intercalated (mixed with $FeCl_3$ and NaF and heated) and exfoliated (heated in 750° C. air) for the second time, and then cleaned (placed in 35 wt % HCl). The result showed more complete and much more pronounced exfoliation where 20 nm nanosheets of pure hBN and pores can commonly be seen, as shown in FIG. 9A. This result also demonstrates that, with additional cycles of intercalation and exfoliation, more extensive exfoliation into even thinner nanosheets is possible.

In the second technique, the hBN was intercalated and exfoliated for the second time in a way similar to the first technique, except the intermediate intercalated product was placed in ambient air for 50 hours before it was exfoliated for the second time in 750° C. preheated furnace, and the sample was covered by a quartz lid during the subsequent 750° C. heating to exfoliate the sample for the second time.

Figure 9B:
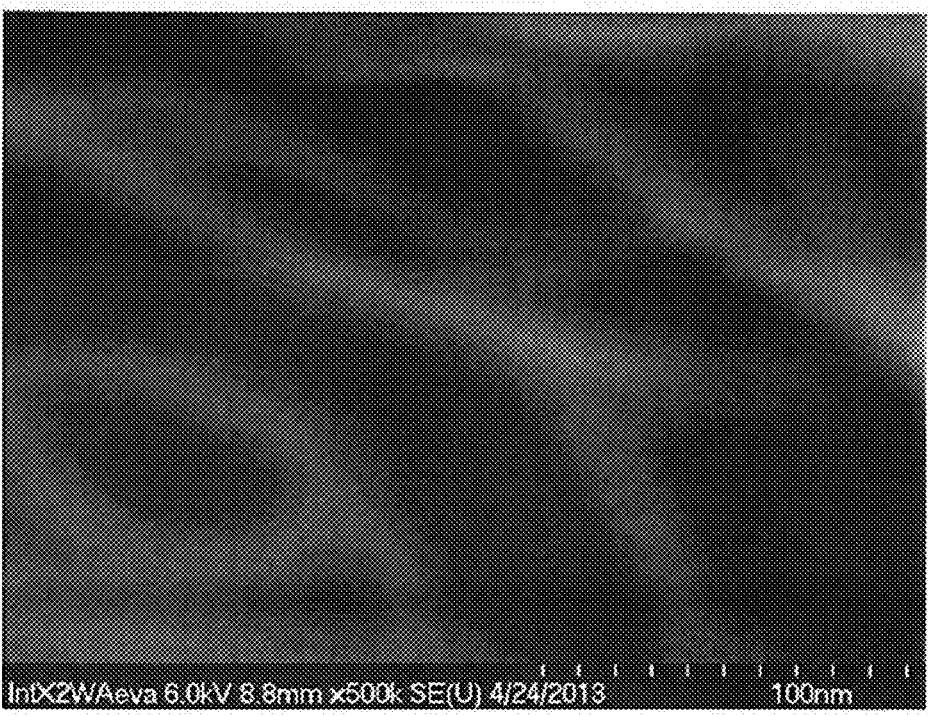

Ambient air (about 30% relative humidity) exposure caused the hygroscopic intercalated hBN to adsorb water of around 10% of its own mass. The subsequent 750° C. heating caused the water and then $FeCl_3$ to quickly boil, resulting in exfoliation and producing steam that carried away some exfoliated BN layers. These BN layers were then deposited on the quartz lid and, after the system was cooled to room temperature, picked up by a piece of carbon tape for SEM examination. SEM pictures show they were piles of nanosheets, about 10-20 nm thick and separated by a space of about 10-60 nm, such as that seen in FIG. 9B.

Exfoliation of hBN, as observed in experiments discussed herein, suggests that the original hBN was intercalated; additional exfoliation after repeating the same process further supports this suggestion.

The apparent enhancement of exfoliation after the hygroscopic intercalated compound picked up moisture in air called for additional study on the reactions between the intercalated compound and water. In a preliminary test, an intercalated sample A3, described in Table 1, was exposed to the ambient environment (24° C., 59-63% relative humidity) overnight after it was stored in dry air for 23 days. This resulted in 20% mass increase. The XRD data indicates that its c lattice parameter and hBN (002) peak width (FWHM) changed from 6.6584 Å and 0.059° to 6.6569 Å and 0.056°, respectively, during the overnight ambient air exposure.

A more detailed study of the effects of moisture in air on the same intercalated hBN was conducted after it was stored in dry air for 4-5 months. In this study, the samples were exposed to room temperature air with different relative humidities and analyzed using 3 different methods (mass, FT-IR and XRD).

Figure 10:
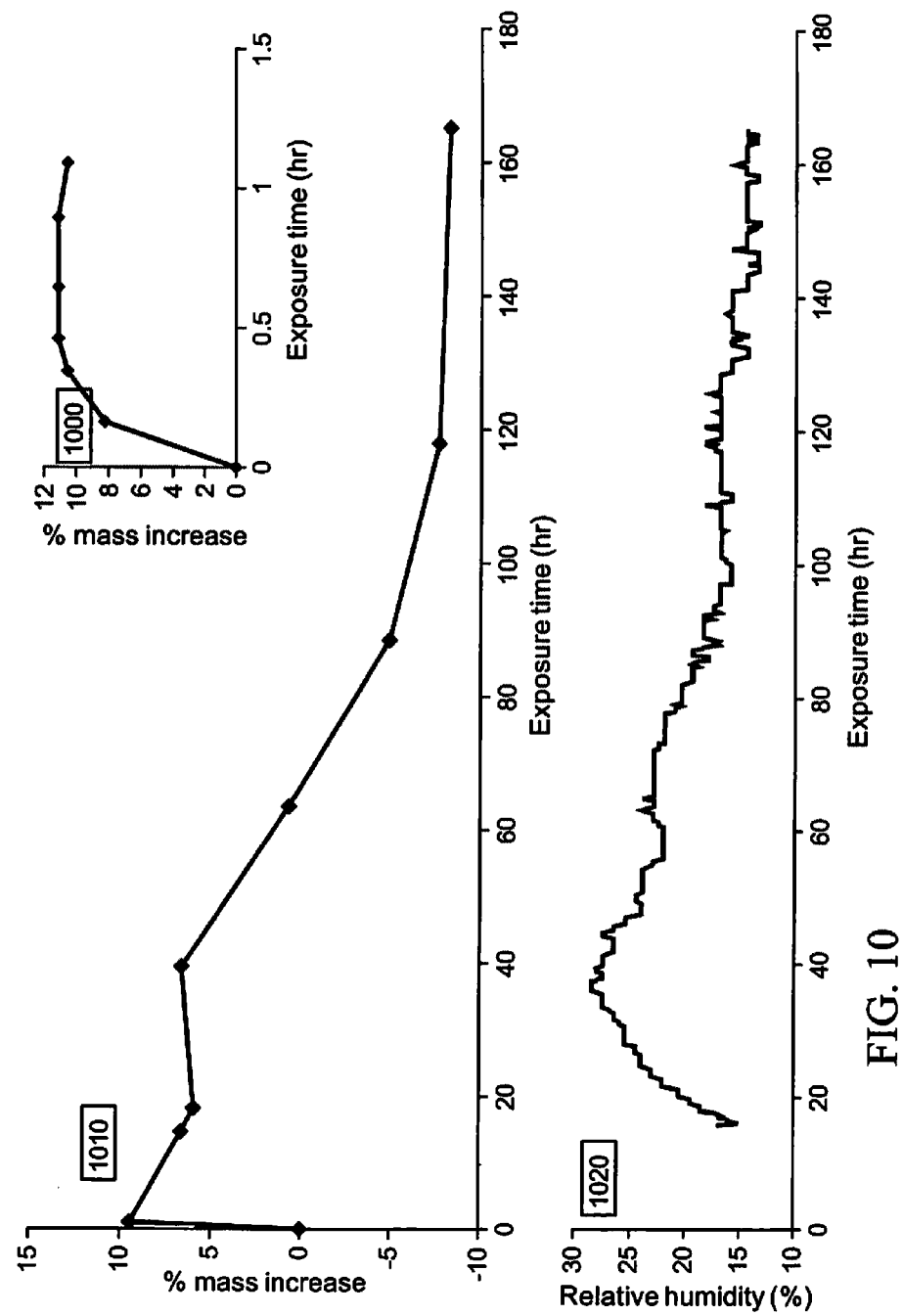
FIG. 10 shows the percent mass increase of two intercalated samples during the ambient air exposure.

FIG. 10 shows the percent mass increase of two intercalated samples during the ambient air exposure. One of them was weighed several times during an exposure time of 66 minutes (1000). The relative humidity was 26-27% during the time of this experiment. The result shows the sample mass increased rapidly during the first 20 minutes and reached a peak in 30-40 minutes of exposure time, to 11% mass gain. The other sample was tested similarly, but during a long exposure time of 165 hours (1010). The relative humidity histogram was also shown (1020). It was in the 15-28% range. It can be seen that after the mass reached a peak value within an hour, it began to decrease continuously for days during the ambient air exposure. Despite the initial mass increase, the overall mass during this ambient air exposure experiment actually decreased. The data suggests that the samples picked up moisture from air quickly. The moisture then reacted with intercalates, resulting in gas products, possibly HCl or $Cl_2$ during the conversion of $FeCl_3$ to $Fe_2O_3$.

For XRD analysis, a sample of the same product (A3 in Table 1) was mounted and filled in a 0.5 mm-deep well ZBH holder and scanned for XRD 12 times during an 85 hours period of ambient air exposure. All of the 12 datasets were obtained from a 10°-90° scan followed by high resolution scans of the (002), (004), (006), and (008) peaks. The sample surface turned dark, but remained intact during data acquisition.

Table 2 shows the 12 datasets of lattice parameter "c", the (002) width (FWHM), and the relative (002) peak height acquired during the course of the 85 hours of ambient air exposure. These values were obtained from the XRD data scanned at 0.005° per step. The "c" lattice parameter and the FWHM relative accuracy were estimated to be, respectively, 0.0002 Å and 0.002° with these scans which were longer in duration and to higher angles than data previously discussed. It can be seen that both the height and the width of the (002) peak continue to decrease throughout the process, indicating a decrease of the crystalline content in the sample. It appears that water absorbed by (and possibly intercalated into) the sample, causing some crystallites to become amorphous, and the reaction would continue for several days or more.

TABLE 2 c parameter, (002) peak width and (002) peak height of an intercalated hBN A3 (Table 1 and FIG. 2) in 85 hrs during which a sample was exposed to the ambient air. The humidity histogram of the air is included. The sample had been stored in dry air for 123 days at the beginning of this experiment. Error is estimated to be ± 0.0002 Å for lattice parameters and ± 0.002° for FWHM values.

| XRD scanning dataset | Total ambient exposure time at the beginning and the end of the scanning (hr) | | relative humidity at the beginning and end of the scanning (%) | | Lattice Parameter from the scanning dataset c (Å) | FWHM from the scanning dataset (deg) | Relative (002) peak height |
|---|---|---|---|---|---|---|---|
| | beginning | end | beginning | end | | | |
| Pure hBN reactant | — | — | — | — | 6.6585 | 0.014 | — |
| 1 | 0.03 | 2.2 | 15 | 16 | 6.6585 | 0.064 | 1.00 |
| 2 | 2.2 | 4.3 | 16 | 17 | 6.6581 | 0.066 | 0.90 |
| 3 | 4.3 | 6.4 | 17 | 18.5 | 6.6580 | 0.066 | 0.89 |
| 4 | 6.4 | 8.6 | 18.5 | 20.5 | 6.6579 | 0.066 | 0.88 |
| 5 | 13.6 | 19.4 | 25.5 | 17.5 | 6.6579 | 0.065 | 0.88 |
| 6 | 24.4 | 30.2 | 14.5 | 14.5 | 6.6579 | 0.062 | 0.84 |
| 7 | 35.2 | 41.1 | 13.5 | 13.5 | 6.6578 | 0.058 | 0.80 |
| 8 | 46.0 | 51.9 | 11 | 13.5 | 6.6582 | 0.053 | 0.74 |
| 9 | 56.9 | 62.7 | 11.5 | 12.5 | 6.6579 | 0.05 | 0.67 |
| 10 | 67.7 | 73.5 | 11 | 13.5 | 6.6579 | 0.047 | 0.61 |
| 11 | 73.6 | 79.4 | 13.5 | 22.5 | 6.6582 | 0.047 | 0.59 |
| 12 | 79.4 | 85.3 | 22.5 | 31 | 6.6582 | 0.048 | 0.58 |

At the beginning, the c parameter was in a decreasing trend. This trend appeared to be leveled at about 40 hrs of ambient air exposure. This suggests that, among the crystallites in the sample, the hBN crystallites that did not became amorphous during this process of humid air exposure are those with smaller c parameter (and therefore smaller interplanar spacing).

Figure 11:
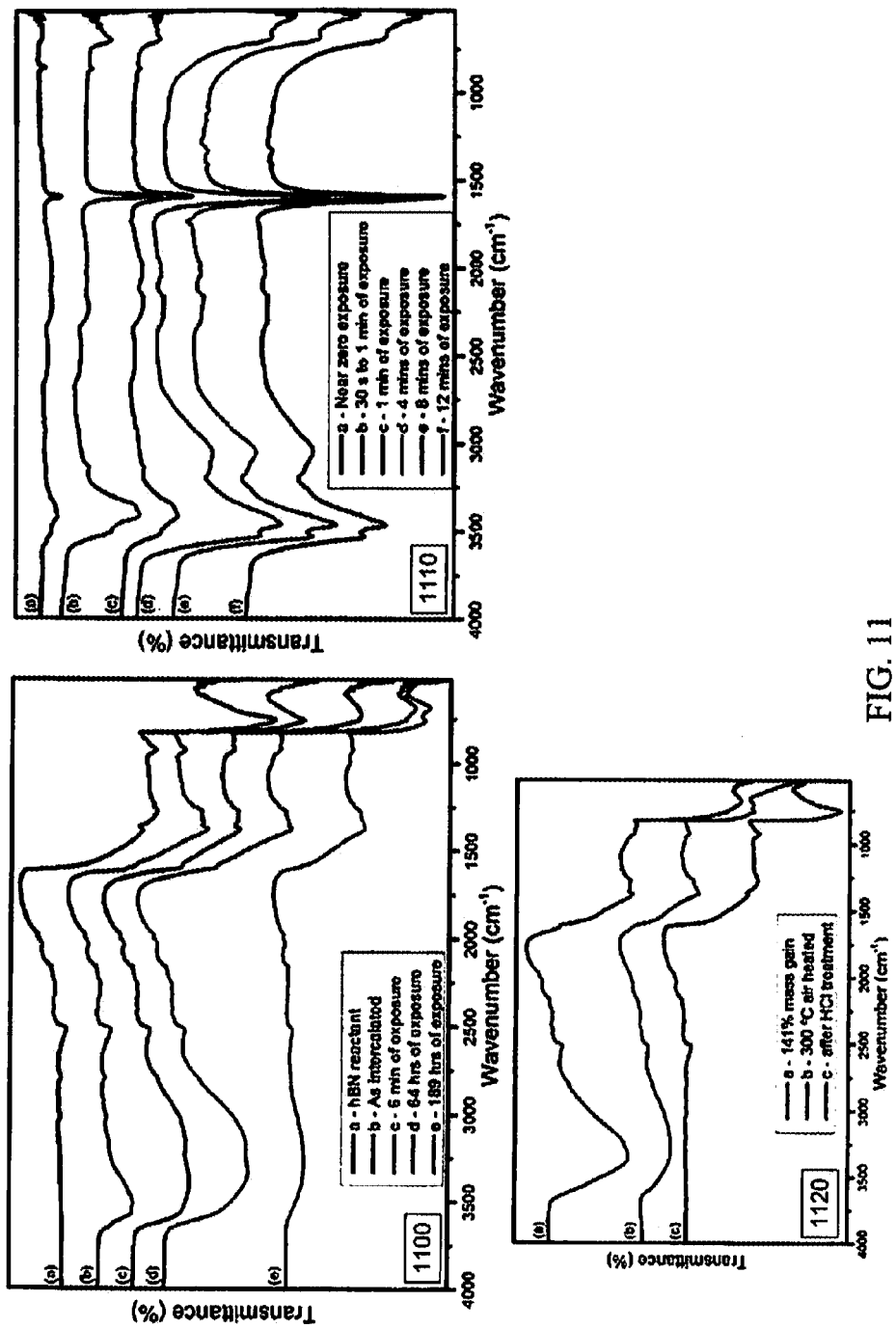
FIG. 11 shows FT-IR of an intercalated product, exposed to ambient air at 15-30% relative humidity for 6 minutes, 64 hrs. and 189 hrs (top left); FTIR of distilled $FeCl_3$ during 12 minutes of air exposure at 44% humidity (top right); and $FeCl_3$ intercalated hBN after sequential treatment of 24 hours air exposure at 100% humidity (141% mass gain), 2 hrs 300° C. air, and 24 hrs room temperature 35 wt % HCl (bottom).

FIG. 11 shows the FT-IR of the same intercalated product (A3 in Table 1), exposed to ambient air at 15-30% relative humidity for 6 minutes, 64 hrs. and 189 hrs., respectively, at 1100. For comparison, the FT-IR of the original hBN reactant and the intercalated product before the ambient air exposure are also included in 1100, and FT-IR of dry (distilled) and wet (ambient-air-exposed) $FeCl_3$ are shown in 1110.

1100 shows the intercalated hBN has 5 prominent FT-IR bands: 750, 1250, 1370, 1600 $cm^{-1}$ bands and a broad 2700-3700 $cm^{-1}$ band. The 1250 and 1370 $cm^{-1}$ bands do not seem to be affected by moisture absorption when exposed to ambient air. The other three bands, on the other hand, have changes in shape/position/size as the intercalated hBN absorb moisture during ambient air exposure. Comparing to these five bands, 1110 shows pure $FeCl_3$ hBN has three prominent FT-IR bands, all of them changes during moisture absorption, and all of them are near the wavenumbers of the three bands in 1100 that changes during moisture absorption. It is therefore believed that the FT-IR changes for the intercalated hBN resulted from moisture absorption, as seen in 1100, are due to the interaction between water and the intercalated $FeCl_3$.

Furthermore, it is observed that the shape/position/size of the three bands in 1100 that changes during moisture absorption have noticeable differences from the three prominent bands in 1110. Their change patterns during moisture absorption were also different. This indicates intercalated $FeCl_3$ is not the same as pure $FeCl_3$, and suggests the possibility that there are interactions between hBN and $FeCl_3$, and their interactions change during moisture absorption.

The double-band near 1600 $cm^{-1}$ (described earlier as the peaks for strained hBN layers and $FeCl_3$, respectively) was again observed in the FT-IR of the intercalated hBN without hydration (curve b of 1100). The fact that this double-band became single after the sample begin to pick up moisture suggests water causes the intercalated $FeCl_3$ to re-arrange during hydration, and hence reduces the internal stress/strain.

After 189 hours of ambient air exposure, both hydration-related bands (2700-3700 $cm^{-1}$ and 757 $cm^{-1}$) were reduced, but the 1280-1380 $cm^{-1}$ band, which were not affected by hydration, did not change much. It appears that water caused some reactions and consequently was consumed. However, no new compounds were detected by FT-IR or XRD during this period.

To further study the effects of water, a new intercalated product (A4 in Table 1) was exposed to 100% relative humidity, room temperature air for 24 hours to gain as much water as possible. The fully hydrated product gained 141% mass and became viscous, paste-like. It was further treated in 300° C. air for 3 hours, and eventually in 35 wt % HCl for 24 hours to remove all intercalates. 1120 shows its FT-IR data and FTIR data of the products obtained during this process. The large quantity of water mass increase was reflected by the complete overlap of the hBN's 760 $cm^{-1}$ band and the hydrated $FeCl_3$'s 679 $cm^{-1}$ band. The water was tightly bounded to the product, as the large and broad water-related 2700-3700 $cm^{-1}$ band could not be completely removed during the subsequent 300° C. air heating. On the other hand, both the intercalation effects and the hydration effects were completely reversed to the states of the original reactant after the final HCl treatment to remove all intercalate.

In summary, upon exposing the hBN intercalated with ferric chloride to ambient air, it adsorbed moisture in air quickly between one or two hours. The moisture in the sample is in the form of iron chloride hydrate (FT-IR data) and is likely to be in the hBN layers (XRD data). The amount of moisture adsorbed depends on the humidity of the air. Data in this research showed 11% mass gain at room temperature and 26-27% relative humidity. Upon continuous ambient air exposure, water in the sample is believed to cause some reactions and consequently was consumed. If the ambient air is close to 100% humidity, the changes are similar in trend, but are extreme. In that case, the adsorbed water was measured to be 141% of the dry mass. During ambient air exposure, the lattice structures change, but are not irreversibly destroyed, as the original hBN's FTIR data can be largely restored by treating this product in 35 wt % HCl.

A sample of an intercalated product (A3 in Table 1) was scanned for XRD immediately after it was synthesized. Two samples of the same product were stored in dry air for 23 days and 185 days, respectively, and then scanned. Table 3 shows the lattice c parameter and the peak width resulted from these three scans. It appears that the intercalated hBN underwent a slow change in dry air. The mass data, however, shows the changes in the chemical compositions during this period were within the experimental error.

TABLE 3 c parameter and (002) peak width of an intercalated hBN A3 (Table 1 and FIG. 2) measure at three different storage times during which the samples were in dry air. The samples were prepared in ambient air for about 5 minutes before XRD scanning. Error estimated to be ±0.0005 Å for lattice parameters and ±0.01° for FWHM values.

| XRD scanning dataset | Storage time (days) | Lattice Parameter from the scanning dataset c (Å) | FWHM from the scanning dataset (deg) |
|---|---|---|---|
| Pure hBN reactant | — | 6.6585 | 0.01 |
| 1 | 0 | 6.6565 | 0.05 |
| 2 | 23 | 6.6584 | 0.06 |
| 3 | 123 | 6.6585 | 0.06 |

Figure 12:
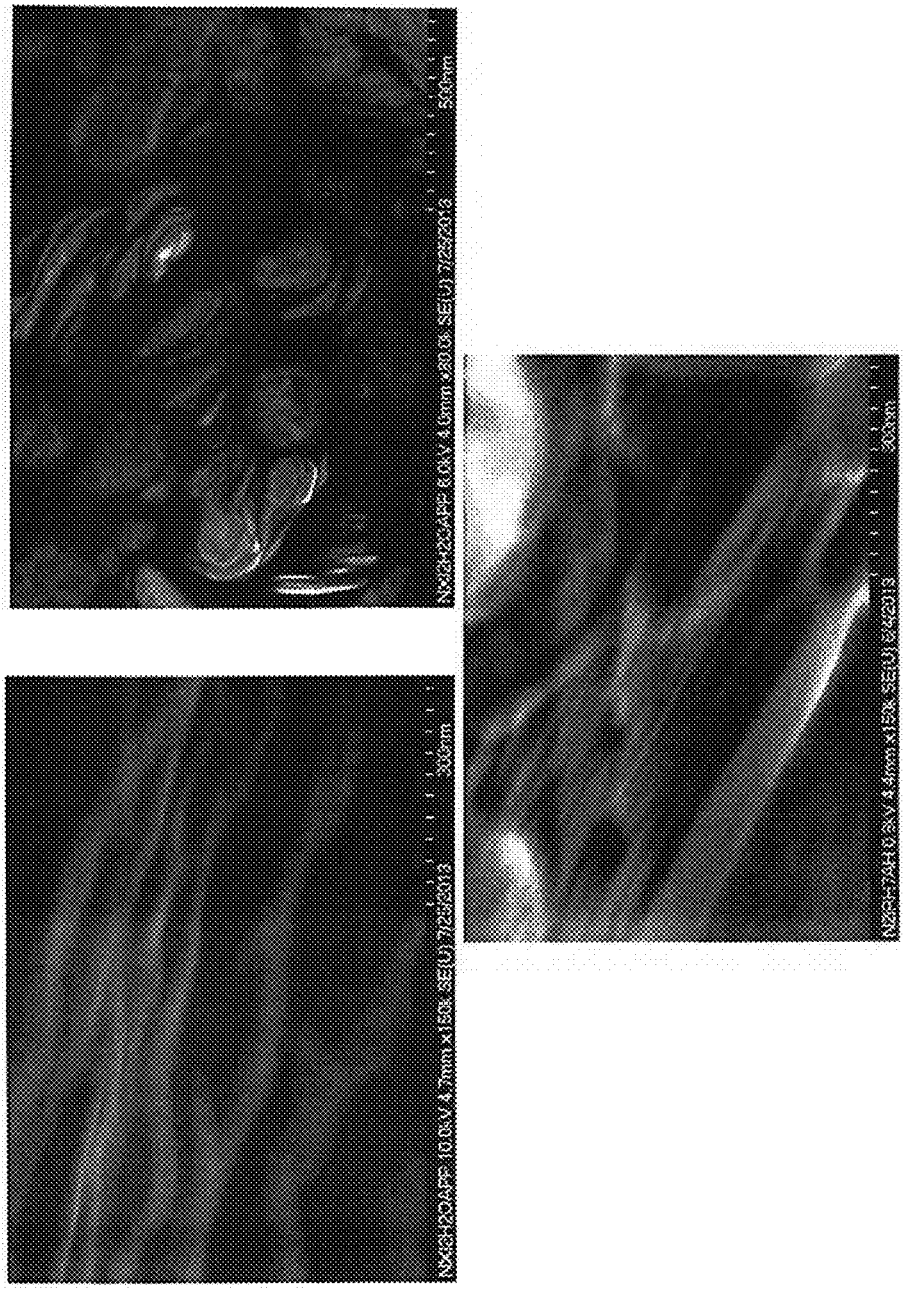
FIG. 12 illustrates an exfoliated sample resulting from small hBN platelets intercalated and then hydrated in 100% relative humidity.

For additional exfoliation, more water can be added into the intercalated products, the intercalated-hydrated product can be heated to higher temperature at higher rate, and more cycles of intercalation-hydration-heating can be conducted for exfoliation. In addition, smaller platelets, with fewer layers and less area to split, may exfoliate more extensively than the larger ones. To test these suggestions, the intercalated small platelet hBN (A5 in Table 1) was exfoliated, rinsed, intercalated again, hydrated, exfoliated again, and then rinsed with HCl according to reactions (2), (3), (6), (7) and (5). For high heating rate, the exfoliation was conducted by heating the sample at 750° C. where both the furnace and the sample holder were preheated. For high degree of hydration, the sample was placed in 100% relative humidity environment for 7.5 hours, resulting in 36.4% mass gain. The final product, seen in the three images of FIG. 12, was the most extensively exfoliated so far in this research. Observing from the FeSEM operated at 6 KV, all hBN platelets that can be examined for exfoliation show that the exfoliated layers are about 20 nm thick or less.

Figure 13:
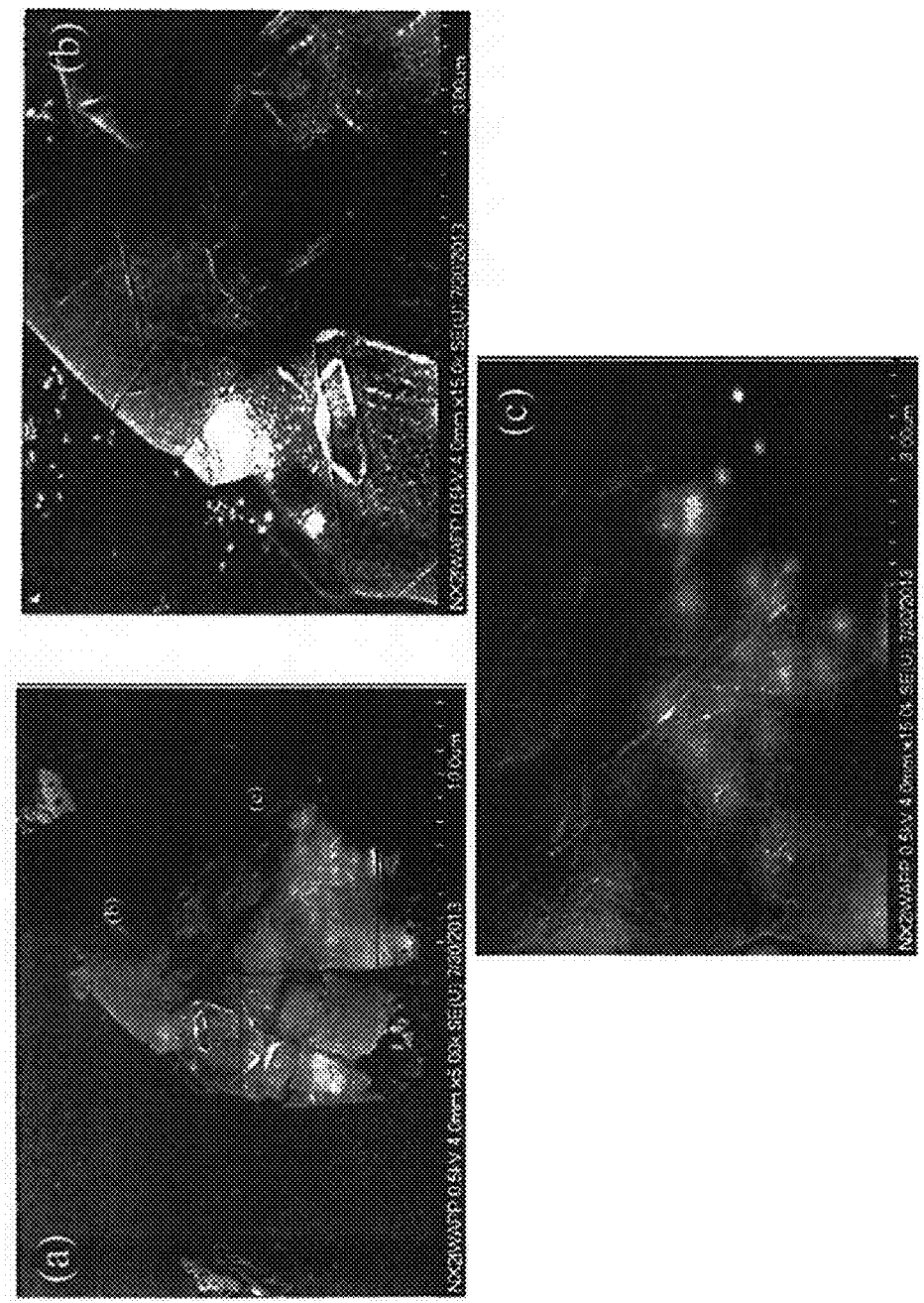
FIG. 13 illustrates a top view of an image of an exfoliated platelet, obtained by SEM operated at 0.5 KV, showing semi-transparent layers of hBN.

Using carbon adhesive tape, a sample was peeled and examined under FeSEM at 0.5 KV. The top view of an exfoliated platelet, seen in FIG. 13, showed multiple semi-transparent layers. Based on the Kanaya-Okayama penetration depth formula, the total thickness of the multiple semi-transparent layers need to be less than 5.5 nm in order to let the 0.5 KV electrons give them a semi-transparent appearance (Let the average atomic weight (A) be 12.5, atomic number (Z) be 6, and density (p) be 2 gm/cm$^3$ in the formula H=0.0276 A V$^{1.67}$/(Z$^{0.89}$p), for the hBN, where H and V are penetration depth in μm and voltage in KV, respectively. The electron need to travel through the layers, hit the subject underneath, and travel through the layers back to be detected in order to give the layers a semi-transparent appearance in SEM photo.).

Producing even thinner exfoliated layers or nanosheets can be achieved with additional cycles of intercalation/exfoliation.

In summary, the first experiment involved treating a mixture of hBN, FeCl$_3$ and NaF at 290-355° C. in nitrogen environment, and examining the resulting product. The changes of the lattice parameter, the widening of the hBN (002) peak in XRD, the shape/size changes of hBN's peak in FT-IR at 1383 cm$^{-1}$ and 1277 cm$^{-1}$, the appearing of new FT-IR peaks at 2700-3700 and 1600 cm$^{-1}$, the mass increase data, the observed iron distribution in pictures and EDS of SEM, and the fact that the hBN can be exfoliated to 20 nm after treating this product to 750° C. heating, collectively make a strong case that FeCl$_3$ was located between the hBN layers in this product. In other word, the hBN was likely intercalated with FeCl$_3$. The fact that these changes were extended, and exfoliation was enhanced after the product adsorb moisture from air suggest the adsorbed water was also intercalated into the hBN layers.

The shape changes of hBN's broad FT-IR band (peaked at 1277 cm$^{-1}$) and the appearing of the new band at 1600 cm$^{-1}$ were observed. The new FT-IR band at 2700-3700 is similar to pure FeCl$_3$'s FT-IR band at the same wavenumber range. However, some of their differences suggest the intercalated FeCl$_3$ is different from the pure one, and there are hBN-FeCl$_3$ interactions in the intercalated product. Overall, the FT-IR data suggests a change in hBN's chemical properties. In various embodiments of the subject innovation, these new chemical properties can be employed to make products such as composites with special electrical, thermal and mechanical properties.

In various embodiments, intercalates other than FeCl$_3$ can be used. This can include AlCl$_3$, CuCl$_2$, MoCl$_5$, SnCl$_4$ (and other metal chlorides), and many others that either are known intercalates for carbon or can be wetted by hBN at their molten states. It is to be appreciated that the examples provided herein are for purposes of illustration, and not to limit the scope of the innovation. In various embodiments, selected chemicals for intercalation can include most any of those discussed herein.

Variations and combinations of the reactions (1) to (7) can result in a large number of different intermediate and final products. An example of the "variations and combinations" of the chemicals and chemical reactions is described in connection with a second set of experiments, where exfoliated hBN containing aluminum oxide was produced. Some of the nanosized aluminum oxide particles were seen to be between the exfoliated BN layers.

Although one example (reactions (8) through (16)) is provided below, multiple variations can result in aluminum oxide dispersed in exfoliated boron nitride. Additionally, hot pressing of this product of aluminum oxide dispersed in exfoliated boron nitride at 1500-2000 C can result in a ceramic composite that is a highly thermally conductive electrical insulator. In accordance with various aspects, the subject innovation can comprise aluminum oxide intercalated in boron nitride, dispersed in exfoliated boron nitride, or a ceramic composite formed from the same.

Below are example series of reactions (8)-(16) used in connection with the second experiment that can produce aluminum oxide dispersed in exfoliated boron nitride in accordance with aspects of the subject innovation:

(8)

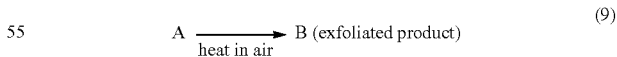
(9)

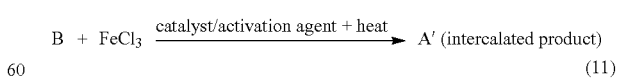
(10)

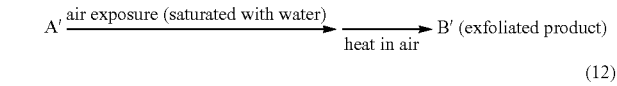
(11)

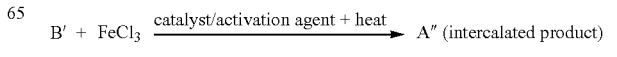
(12)

-continued

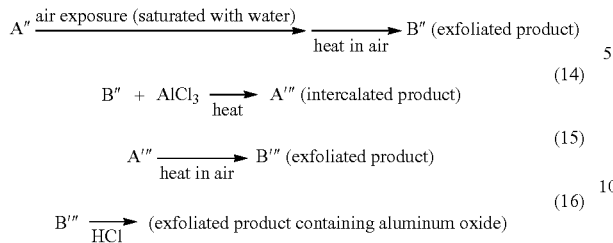

(13)
(14)
(15)
(16)

Figure 14:
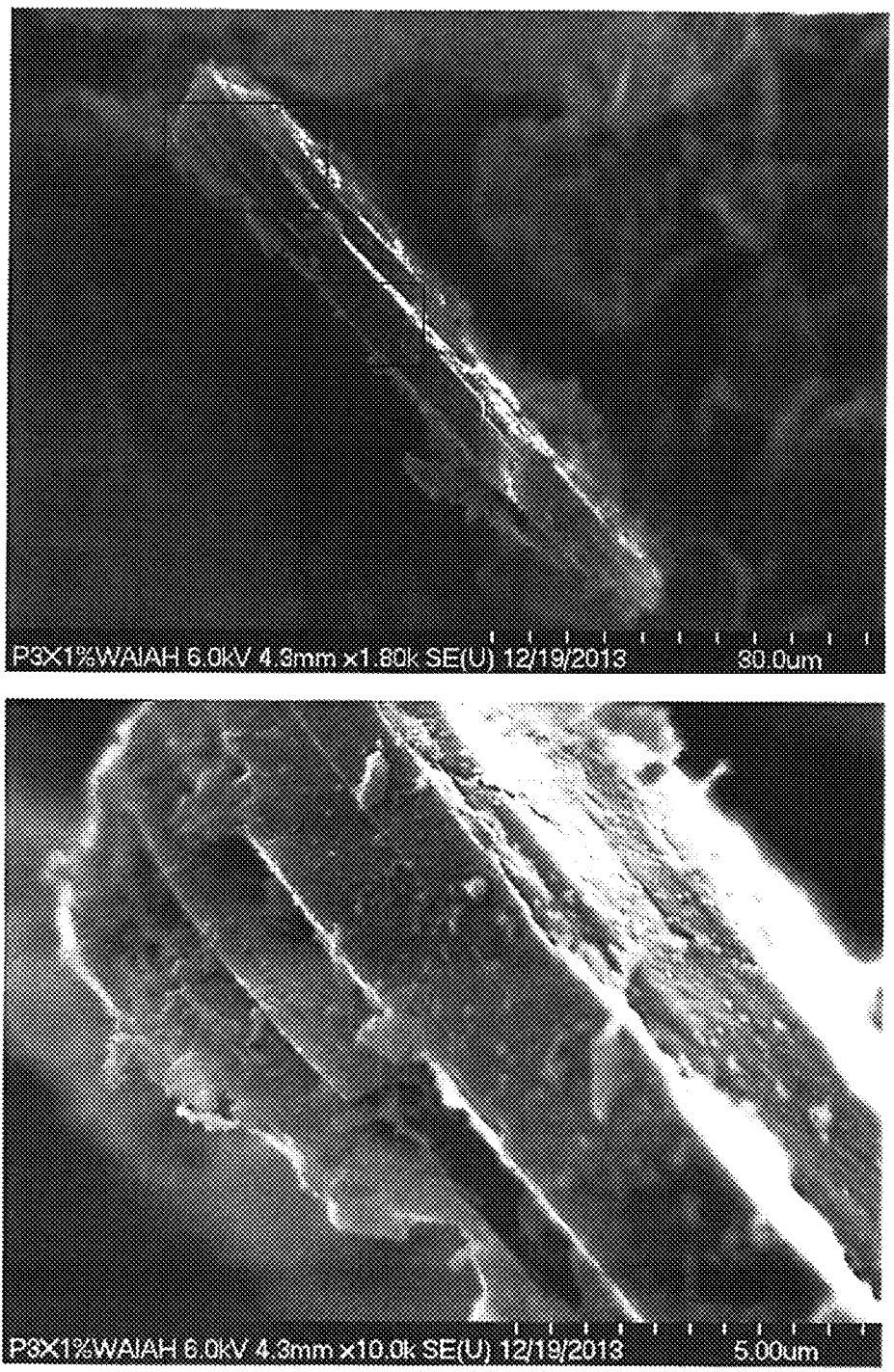
FIG. 14 illustrates SEM images of an exfoliated product containing aluminum oxide.
Figure 15:
FIG. 15 illustrates additional SEM images of an exfoliated product containing aluminum oxide.
Figure 15:

In the example experiments conducted in connection with reactions (8) through (16), the catalyst was NaF. The heat during intercalation with $FeCl_3$ was in nitrogen at 250-400° C. range, and the heat during intercalation with $AlCl_3$ was in nitrogen at 130-240° C. range. The heat in air during exfoliation was done by placing samples (with sample holder at room temperature) in a furnace that was preheated to 750° C. Air exposure with saturated water vapor was done at room temperature, where samples were in a closed container containing some liquid water. B, B' and B" above were BN containing iron oxide, and B''' was BN containing aluminum oxide and iron oxide. Because HCl dissolves iron oxide, but not aluminum oxide, the iron oxide was removed during (16), but the aluminum oxide remained. FIG. 14 shows two SEM images of the final product E, with the second image corresponding to the boxed region 1410 in the upper image; FIG. 15 shows two additional images of the final product, with the upper image corresponding to the boxed region 1420 of FIG. 14, and the lower image corresponding to the boxed region 1510. The lower image of FIG. 15 is a backscattered picture that shows aluminum as bright and BN as dark, and also shows the BN's exfoliate layers that cannot be seen in the top image of FIG. 14. The dispersed aluminum oxide within the BN layer can be clearly seen in the lower image of FIG. 15.

In another portion of the second set of experiments, the following reactions were used to create hBN with an aluminum oxide coating:

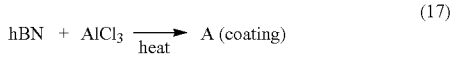

(17)

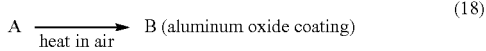

(18)

The heat with $AlCl_3$ was in nitrogen at 130-240° C. range, and the heat in air during exfoliation was done by placing samples (with sample holder at room temperature) in a furnace that was preheated to 750° C. The $AlCl_3$ contained water (0-5% mass) in the experiment that gave the product (BN with aluminum oxide coating).

Figure 16A:
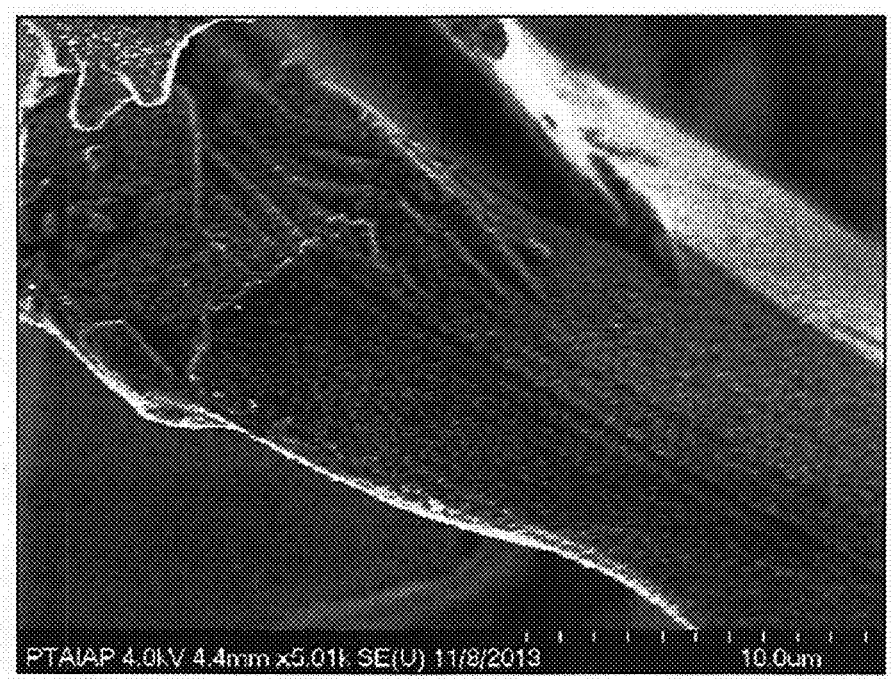
FIG. 16A shows an SEM of nanosized aluminum oxide coating on hBN, top.
Figure 16B:
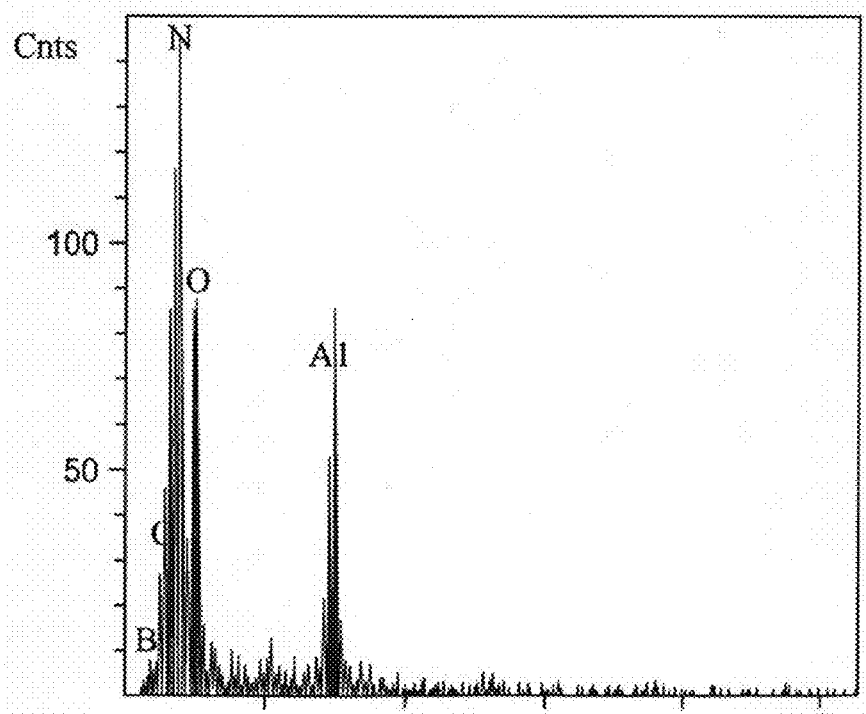
FIG. 16B shows an EDS (Energy-dispersive X-ray spectroscopy) graph showing the coating is aluminum oxide.
Figure 17:
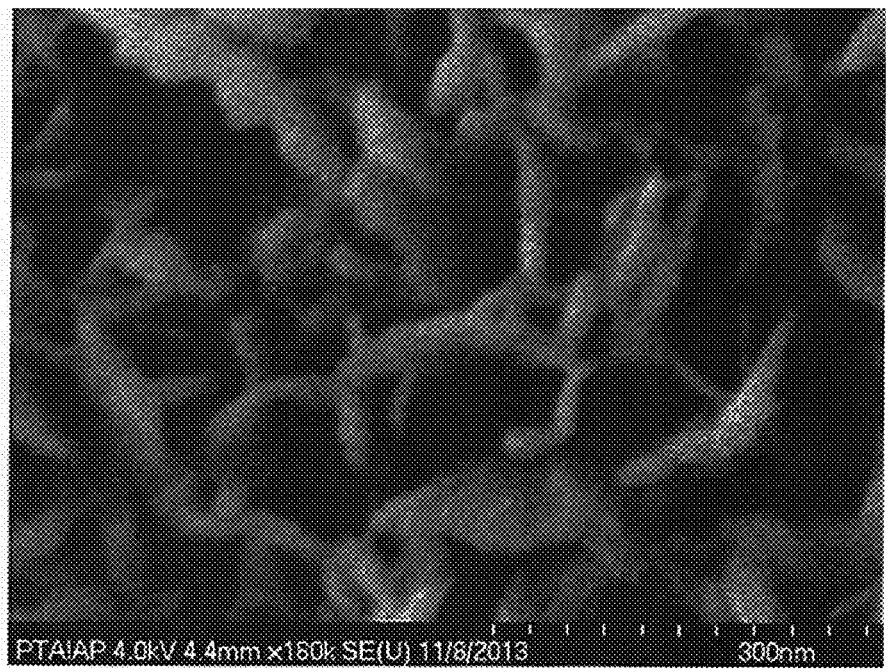
FIG. 17 shows two additional SEM images of the nanosized aluminum oxide coating on hBN.
Figure 17:

FIG. 16 shows an SEM of nanosized aluminum oxide coating on hBN, top, and an EDS (Energy-dispersive X-ray spectroscopy) graph showing the coating is aluminum oxide. FIG. 17 shows two additional SEM images of the nanosized aluminum oxide coating on hBN, a top view (above) and a side view (below).

In a third set of experiments, intercalation and exfoliation of $MoCl_5$ in hBN was explored, partly to test and demonstrate the range of intercalates that can be used with hBN, and partly to produce material useable to create boron nitride-molybdenum-oxygen nanocomposite articles. The following reactions were used in these experiments:

(19)

(20)

(21)

Figure 18:
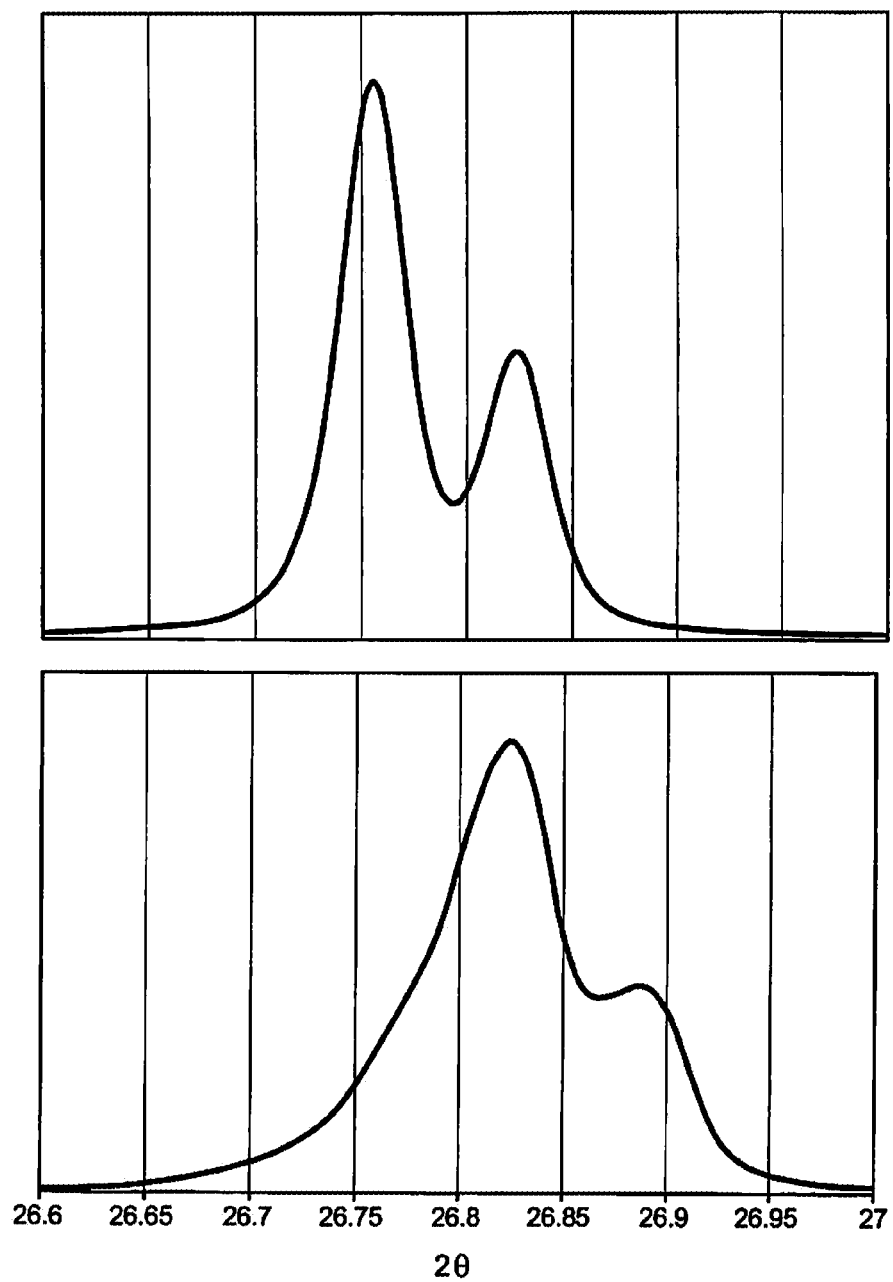
FIG. 18 shows XRD graphs of an original sample of hBN and molybdenum pentoxide intercalated hBN.

Starting from a sample of large hBN particles (20-80 μm wide and 5-10 μm thick platelets), the molecular structure of the product A (in reactions (19)-(21)) changed so significantly that the x-ray diffraction (XRD) (002) peak position shift and peak width increase can be visually observed in FIG. 18, showing the original hBN in the upper graph, and the product A in the lower graph. Exfoliation of a platelet (in product E in the above formula) can be observed in the SEM images in FIG. 19. The upper image shows the $MoCl_5$ intercalated hBN after HCl treatment, showing some layer split even before normal exfoliation treatment. Backscattered electrons were used for this image; the brighter regions contain more molybdenum and less boron nitride and the darker regions contains contain less molybdenum and more boron nitride.

Figure 19:
FIG. 19 shows SEM images of an exfoliated platelet made by molybdenum pentoxide intercalation and heating molybdenum pentoxide intercalated hBN in air.

Starting from a sample of small hBN particles (200-800 nm wide 80-200 nm thick platelets), the lower SEM image in FIG. 19 shows the product B (in the above formula) was exfoliated to 10 nm or less. It is noted that this product ("B" in reaction (21)) was nearly pure by energy dispersive spectrum (EDS). Apparently, rapid heating at 750° C. air caused almost all of the molybdenum chloride to be evaporated before it could be oxidized. This is unlike iron chloride or aluminum chloride, both of which were mostly oxidized under the same condition before they could be evaporated.

Figure 20:
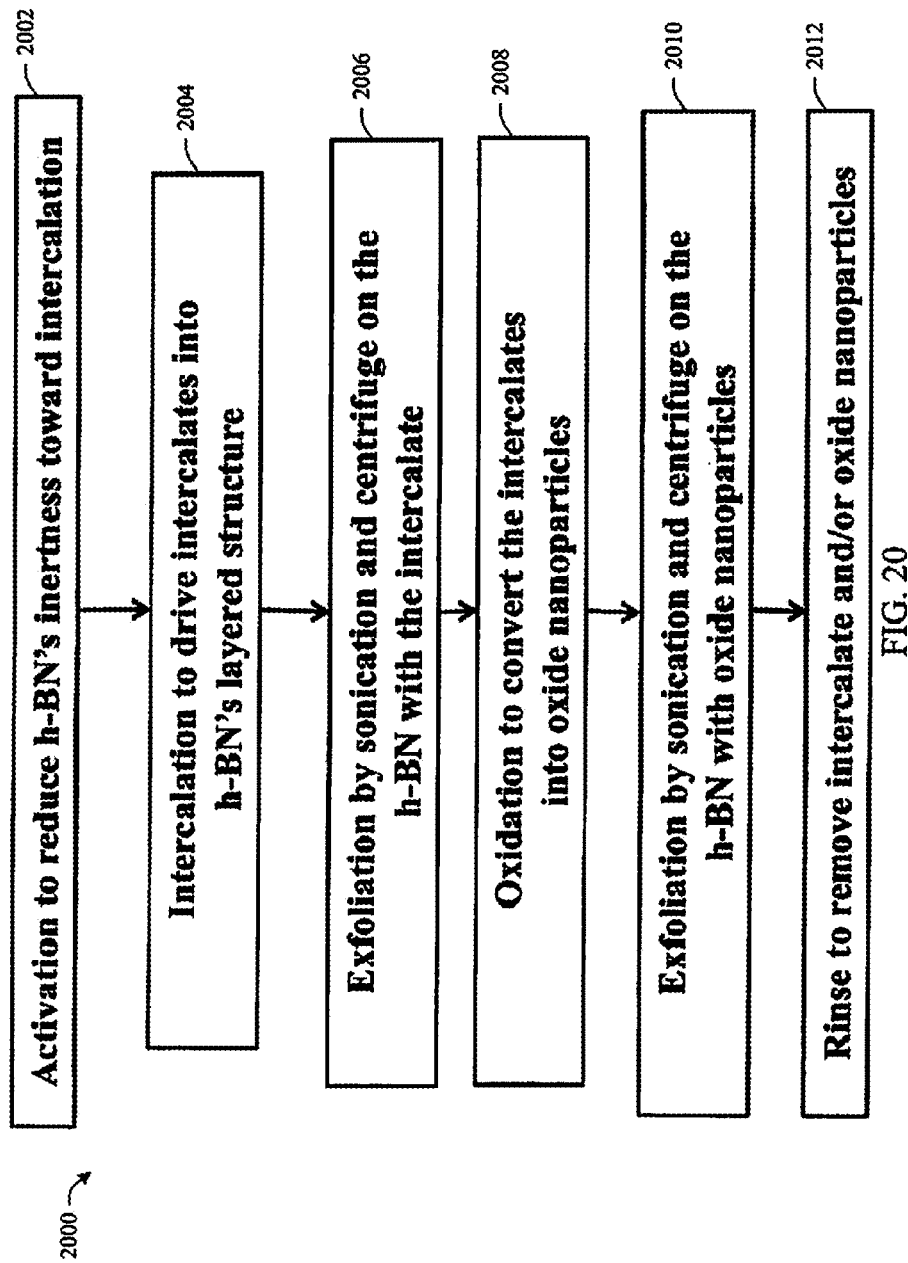
FIG. 20 illustrates a method of intercalation and exfoliation of hBN employed in connection with a set of experiments discussed herein.
Figure 21:
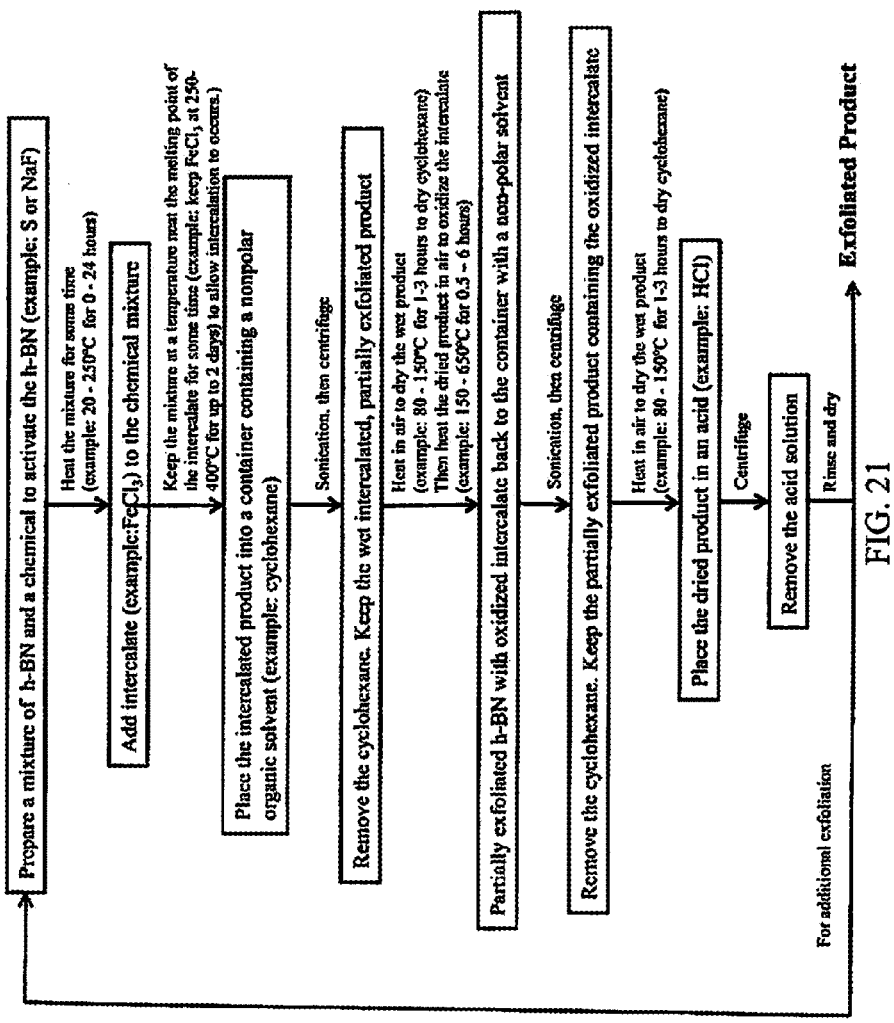
FIG. 21 illustrates another method employed for intercalation and exfoliation in connection with experiments discussed herein.

FIG. 20 illustrates a method 2000 of intercalation and exfoliation of hBN employed in connection with a fourth set of experiments. The method can begin at 2002 with activating a sample of hBN (e.g., with NaF, S, etc.) to reduce its inertness toward intercalation. At 2004, the method can continue with intercalating the hBN with one or more intercalates, such as the metal chlorides discussed herein (e.g., iron, aluminum, molybdenum, etc.), for example, by heating the hBN, activating agent, and material selected for intercalation for a first period of time (e.g., at a temperature and for a time that can depend at least on the material selected for intercalation, as described above). Next, at 2006, the intercalated hBN can be exfoliated, such as by rapid heating, sonication, etc. At 2008, the intercalates can be oxidized to convert them to oxide nanoparticles, and at 2010, further exfoliation can be employed (e.g., as described herein, etc.), followed at 2012 by rinsing the exfoliated material to remove intercalate and oxide nanoparticles. FIG. 21 illustrates another method 2100 that was employed for intercalation and exfoliation in connection with experiments discussed below.

In the fourth set of experiments, hBN was intercalated with $FeCl_3$, and then exfoliated via sonication. Although sonication was used in this set of experiments, and heating used in those listed above, in various embodiments, heating, sonication, etc., or any combination thereof can be employed. A mixture of highly crystallized commercial hBN (about 20-80 μm in diameter and 5-20 μm thick), NaF and $FeCl_3$ was placed in a tube. The mass ratio of these three chemicals was 1:0.12:2.7, respectively. The mixture was heated to 315° C. for about 12 hours and then 340° C. for 2 hours. Since the boiling point of $FeCl_3$ is 315° C., the excess $FeCl_3$ was evaporated from the sample. The product was approximately 180% of the original boron nitride mass, and was brownish yellow in color.

Figure 22:
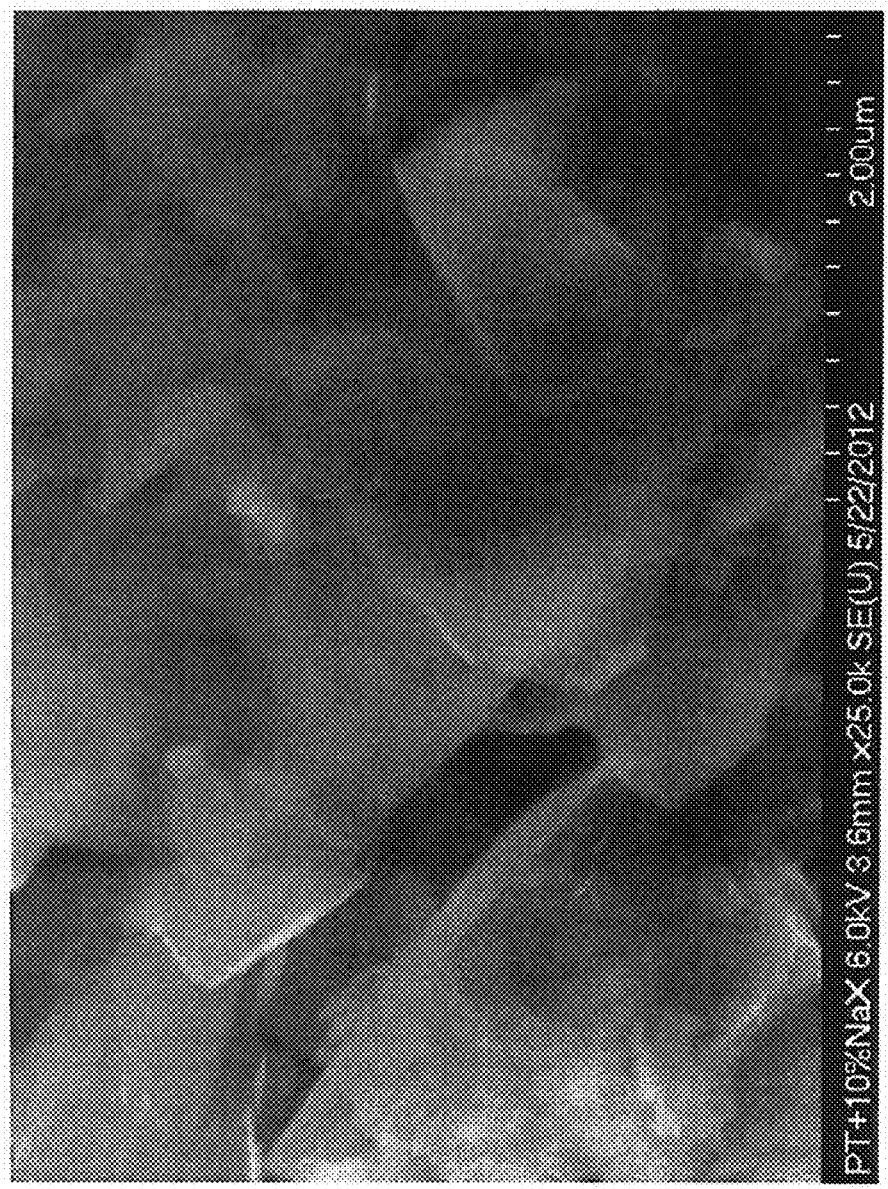
FIG. 22 illustrates an SEM picture of a final product of this process, in which exfoliation of hBN can be seen.
Figure 23:
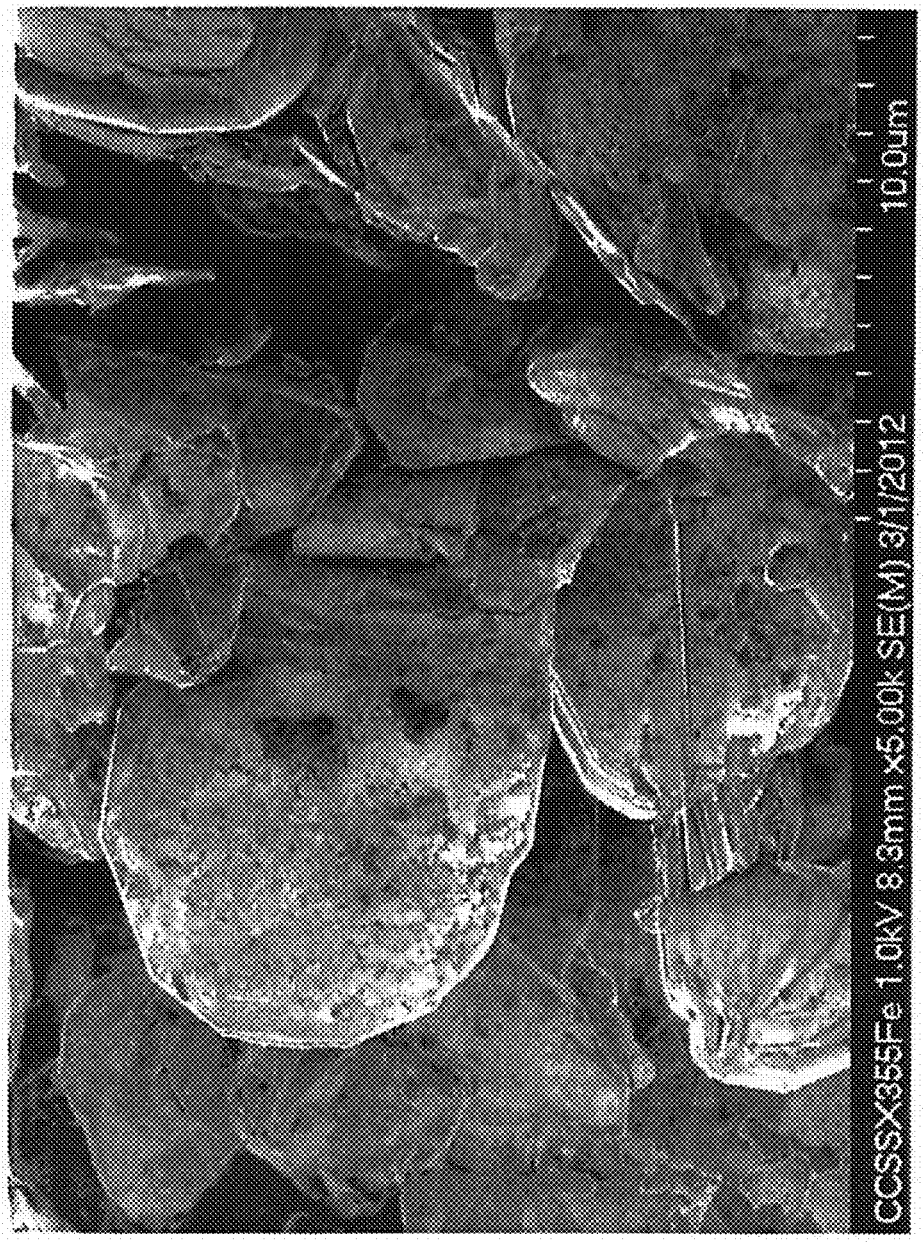
FIG. 23 illustrates an SEM image at 1 kV showing some BN layers that were semi-transparent or almost invisible.

The intercalated product (A1 in Table 1) was sequentially treated for the purpose of exfoliation (i.e., split the boron nitride layers) by removing the inserted chemicals (i.e., deintercalation, where intercalates exit the boron nitride layers). This was done as follows: (1) sonicated in $C_6H_{12}$ for 6 hours, then centrifuged at an acceleration of 2250 times that of gravity (i.e., 2250G); (2) dried and heated in 150° C. air; (3) sonicated in $O_6H_{12}$ again for 6 hours, centrifuged under the acceleration of 2250G, dried; (4) heated in 450° C. air for 5.5 hours; (5) sonicated in $O_6H_{12}$ for a third time for 6 hours, centrifuged under the acceleration of 2250G, dried; and (6) rinsed in HCl and water. After this series of treatment, the sample became white in color. EDS data from SEM's energy dispersive spectrum showed it contained only boron and nitrogen, indicating complete removal of the inserted chemicals. The XRD for samples at different stages of this series of treatments showed that the overall XRD changes during the entire series of treatments was narrower peaks for (002) and (100), larger peaks for (002) with the changes of (001) peak heights complicated but not obvious. Overall, this indicated changes of boron nitride lattice structure during the removal of the non-boron nitride chemicals. FIG. 22 shows an SEM picture of a final product of this process, in which exfoliation of hBN can be seen. FIG. 23 shows an SEM image at 1 kV showing some BN layers that were semi-transparent or almost invisible. These exfoliated layers were made according to the intercalation-sonication-rinse process described above, but from a different kind of commercial hBN as the starting reactant (about 10-20 μm diameter and >2 μm thick). For BN exfoliated layers to be semi-transparent to electrons at this voltage, their thickness needs to be about 20 nm.

In a fifth set of experiments, intercalation and exfoliation of hBN by $FeCl_3$ activated by fluoride agent other than NaF was explored. This is to test and demonstrate the range of activating agent that can be used with hBN for intercalation and exfoliation. Three reactant mixtures were placed side by side and treated for intercalation and exfoliation simultaneously. For all 3 mixtures, the mass ratio of $FeCl_3$ to hBN are about 4.5 to 1. Their hBN to activating agent (LiF, NaF or KF) mass ratio in the reactant mixture were adjusted such that their molar ratios were the same, about 1.1 to 1. The products were examined by XRD (x-ray diffraction). Based on SEM pictures as well as changes of hBN's XRD peak heights, widths and positions resulted from intercalation reactions, it is concluded that all of them (LiF, NaF and KF) have the activating effects on intercalation of hBN by $FeCl_3$, and KF has more activating power than NaF, which has more activating power than LiF.

Figure 24A:
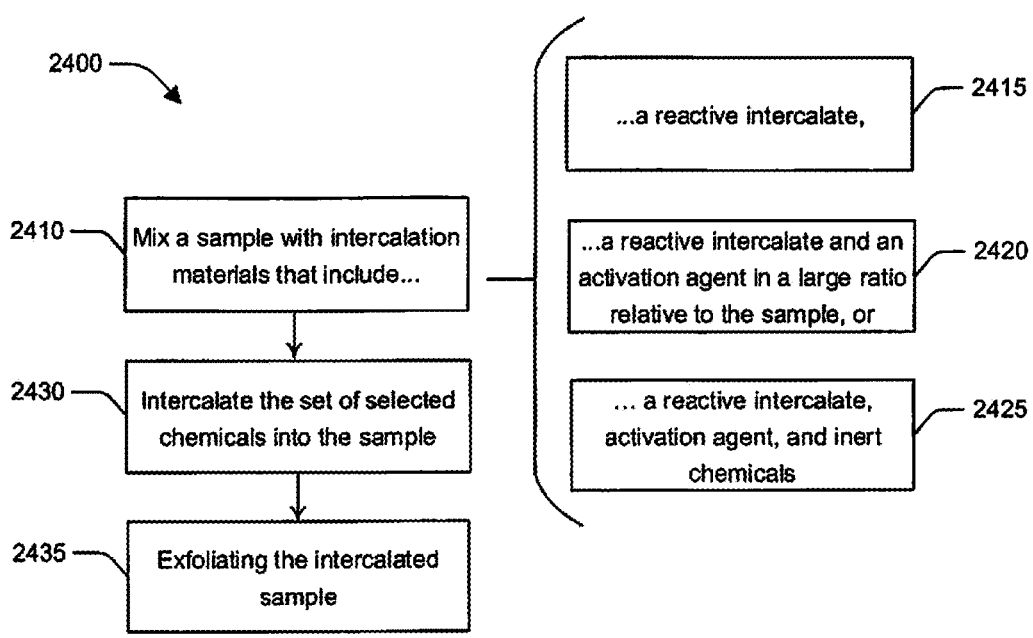
FIG. 24A illustrates one embodiment of a method that can facilitate intercalation and exfoliation of a starting reactant in accordance with aspects of the subject innovation.

FIG. 24A illustrates a method that can facilitate intercalation and exfoliation of a starting reactant in accordance with aspects of the subject innovation. At 2410, a sample of a starting reactant is mixed with intercalation materials. The starting reactant is selected based on the desired properties of the layered structure that results from the sample being subjected to the intercalation-exfoliation process. For example, hBN may be selected as the starting reactant if white graphene is the desired result. Alternatively, boron nitride nanotubes may be used as the starting reactant if the desired result is a layered structure having nanoribbons. Again alternatively, hBN intercalated with $FeCl_3$ and then exfoliated at high temperature air, such as B" in Reactions (13) and (14) described earlier, may be used as the starting reactant if the desired result is a layered structure where individual layers (i.e., boron nitride nanosheets) separated by alumina and $Fe_2O_3$ particles (B'" in reaction 15)

The starting reactant is mixed with intercalation materials. The intercalation materials include a selected set of chemicals for intercalation, such as a reactive intercalate, an activation agent, and or inert chemicals. The selection of the selected set of chemicals for intercalation, the activation agent, and the inert chemicals, as well as the ratios of the intercalation materials are provided in will change the physical properties of the resulting layered structure. Accordingly, the selections of the intercalation materials and ratios are based on the application of the layered structure.

For example, at 2415 the intercalation materials include a reactive intercalate. A reactive intercalate can be selected such that an activation agent does not need to be added to the mixture. For example, the reactive intercalate may be wet aluminum chloride, $AlCl_3$ containing moisture picked up from air, making an activation agent unnecessary. Using a reactive intercalate without an activation agent changes the intercalation process (e.g., limit intercalation at the surface of the starting reactant, add wait time for intercalation, operate at a different temperatures, etc.).

In the example, in which the reactive intercalate is aluminum chloride containing water about 0.3 to 3% of the aluminum chloride mass. Too much water may stop the process of intercalation, and result in separate phases of aluminum oxide and hBN platelets of the sample without coating (i.e., intercalation at hBN surface only). Too little water may result in the aluminum chloride evaporating instead of the hBN platelets being coated.

The selection of intercalation materials may also affect how the intercalation materials are mixed with sample. For example, using a reactive intercalate may change the temperature at which the intercalation materials are mixed with the sample. Mixing the sample with aluminum chloride containing 0.3-3% water may involve mixing well and keeping the mixture at a temperature below 100° C. for some time before heating. For example, the mixture may be mixed well and kept at near room temperature overnight before heating to 130° C. and higher. This was done earlier (reactions (17)) without the detailed process description shown here (above 4 paragraph). After subsequent heating at 750° C. in air, (reaction (18)), SEM pictures of the product thus obtained (FIGS. 16 and 17) show this process produced most complete alumina coating on the sample.

At 2420, the intercalation materials includes a reactive intercalate and activation agent in a large amount relative to the amount of the starting reactant. In Table 1, the mass ratio of the activation agent, NaF, to the sample, hBN, is shown to be in a range 0.1 to 0.2. However, that ratio can be increased tenfold causing the nanosheets of the layered structure to be more separated and visualized more clearly. This can be seen by comparing the SEM picture in FIG. 25 (NaF/hBN mass ratio 1,5) to that in FIG. 8A (NaF/hBN mass ratio 0.15).

At 2425, the intercalation materials includes a reactive intercalate, an activation agent, and inert chemicals. The inert material is included in the mixture so that the layered structure will have specific physical properties. After the intercalation-exfoliation process, the inert material is present between the individual sheets of sample material in the layered structure. Accordingly, the layered structure is imbued with the physical properties of the inert materials. For example, the inert substance may be titanium dioxide, which has a high dielectric constant. Accordingly, the resulting layer structure would have a high dielectric constant.

Figure 26:
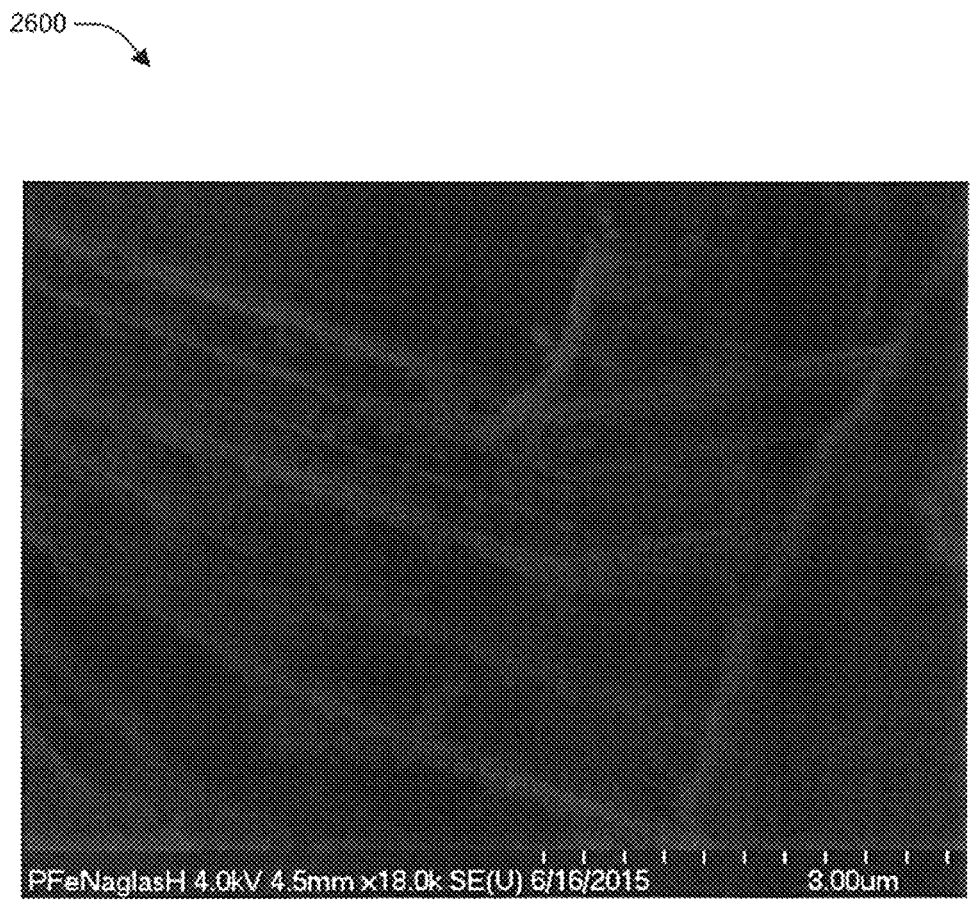
FIG. 26 is an SEM picture that illustrates one embodiment of parallel sheets of a sample separated by glass particles.

In another embodiment, inert chemicals may be used to make the layered structure porous. For example, a sample of hBN may be mixed with FeCl3 and inert chemicals, including glass particles. During the intercalation, FeCl3 move into hBN layers and carries the glass particles with it. After intercalation, FeCl3 (or Fe2O3 if oxidized) is removed from hBN layers by HCl, leaving the inert glass particles behind. These glass particles occupy part of the spaces between the hBN layers and keep the layers separated. Without the inert glass particles, the separated hBN layers would stack back together when the FeCl3 is removed. The space which was occupied by FeCl3 before being removed becomes empty space between the separated hBN layers. A porous hBN sample is thus synthesized where sheets of thin hBN layers are kept from stacking together by the inert chemicals. FIG. 26 is a SEM picture showing such separated hBN nanosheets.

The pores can be filled with other chemicals to become new materials with new physical properties. For example, the pores can be filled with BaTiO3 and then subjected to a hot press in 1000-2000° C. to become a new material with high dielectric constant and high dielectric strength. Due to the presence of the inert chemicals between the separated sheets of the layered structure, the 2D alignment of the sheets will be disturbed during hot press at 1000-2000° C. on the porous hBN. The disturbance may cause some sheets to become "fin" from the original hBN's 2D plane due to the compression force of the sheets and the inert chemicals between them. The result is increased thermal conductivity in the direction perpendicular to the direction of the original hBN reactant's 2D plane.

Steps 2415, 2420, and 2425 are example of how the intercalation materials can be varied. These are three of the examples of how the intercalation materials can be used. In addition to the examples given, variations of the intercalation materials may also be mixed. For example, a sample of hBN may be mixed with more than one kind of reactive intercalate, inert chemicals, including glass particles, as well as an activation agent. Other combination of the intercalation materials may also be used.

At 2430, the intercalation materials are intercalated into the sample. As discussed above with respect to FIG. 1, the intercalation may be caused by the mixture of the sample and the intercalation materials being heated in an inert environment. Additionally, the intercalation may include hydrating the intercalated mixture in a high humidity environment.

At 2435, the intercalated mixture is exfoliated. As discussed above with respect to FIG. 1, exfoliation may include a rapid heating in air for a second period of time according to a first heating pattern or histogram, or by sonication, or a combination thereof. Product from 2430 is exfoliated hBN where metal oxide nanoparticles are in the spaces between the exfoliated layers. It is a stable product in ambient air, but not as inert as the reactant hBN. Therefore, it can be reactive to other chemicals and converted to other forms (i.e., new products).

Figure 24B:
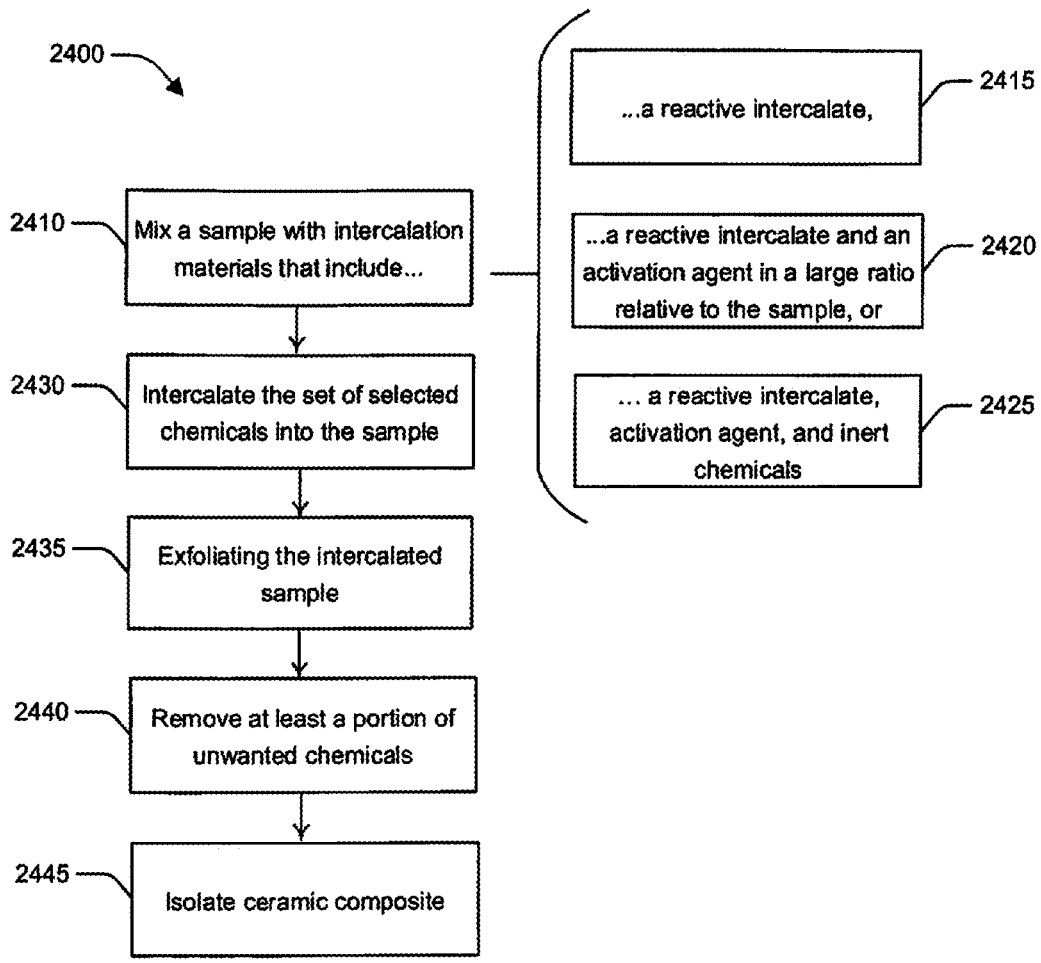
FIG. 24B illustrates another embodiment of a method that can facilitate intercalation and exfoliation of a starting reactant in accordance with aspects of the subject innovation.

FIG. 24B illustrates another embodiment of a method that can facilitate intercalation and exfoliation of a starting reactant in accordance with aspects of the subject innovation. Specifically, FIG. 24B illustrates a method for fabrication of an hBN-alumina ceramic composite. The steps 2410, 2430, and 2435 are performed in a similar manner as described above with respect to FIG. 24A. Likewise, the intercalation materials described above in elements 2415, 2420, and 2425 also pertain to step 2410.

Following the exfoliation at 2435, at 2440, a portion of unwanted chemicals may be removed from the exfoliated intercalated sample. For example, in the layered structure where individual layers (i.e., boron nitride nanosheets) are separated by alumina and $Fe_2O_3$ particles (B''' in reaction 15), iron oxide may be removed from the exfoliated sample, leaving alumina particles in the exfoliated layers (pictures in FIGS. 14 and 15). At 2445, a ceramic composite is isolated. For example the ceramic composite may be isolated by hot pressing the exfoliated hBN containing alumina at 2000° C. and 10 Ksi resulted in an hBN-alumina composite (60% hBN and 40% alumina). This sample has a high in-plane thermal conductivity of about 85 w/m° K. Isolating this specific ceramic composite, is one example of a product that may be formed from the method described with respect to FIG. 24B.

In another example, following earlier description on 2415, by skipping 2440 as there is no unwanted chemicals in the sample, hot pressing the hBN coated with alumina (product of 2435, product of reaction (18) in this example, SEM picture in FIGS. 16 and 17) at 2000° C. and 10 Ksi resulted in an hBN-alumina ceramic composite (2445, 90% hBN and 10% alumina). This composite has a very high in-plane thermal conductivity, about 150 w/m° K.

Figure 24C:
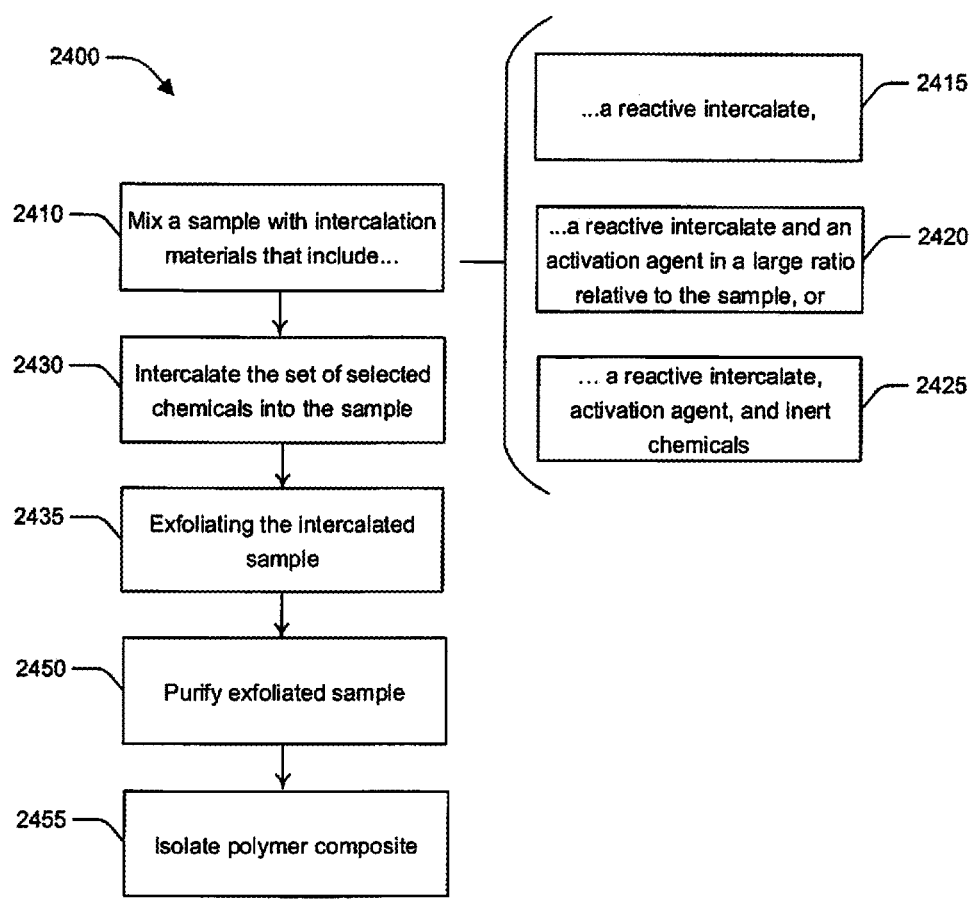
FIG. 24C illustrates another embodiment of method that can facilitate intercalation and exfoliation of a starting reactant in accordance with aspects of the subject innovation.

FIG. 24C illustrates another embodiment of a method that can facilitate intercalation and exfoliation of a starting reactant in accordance with aspects of the subject innovation. Specifically, the purified exfoliated hBN has applications as fillers in composites such as polymer nanocomposites with enhanced properties as energy conversion systems. The steps 2410, 2430, and 2435 are performed in a similar manner as described above with respect to FIG. 24A. Likewise, the intercalation materials described above in elements 2415, 2420, and 2425 also pertain to step 2410.

At 2450, the exfoliated sample is purified. Accordingly, unwanted materials can be totally or partially removed from the exfoliated samples. The materials to be removed may be identified based on the desired properties of the product. The product is isolated at 2455.

In one embodiment, the hBN filled composite has a piezoelectric or pyroelectric matrix. Piezoelectric and pyroelectric materials have the ability of generating a charge as a result of a mechanical stress (piezo-) or thermal changes (pyro-). For instance, polyvinylidene fluoride (PVDF) is a lightweight ferroelectric material with very good piezoelectric and pyroelectric properties. The intercalate-exfoliated hBN fillers in a PVDF/hBN nanocomposite can utilize vibrations and/or thermal changes caused by various aerospace propulsion systems. A PVDF/hBN can be fabricate to make a lightweight self-charging and/or self-generating nanocomposites for energy conversion.

Figure 25:
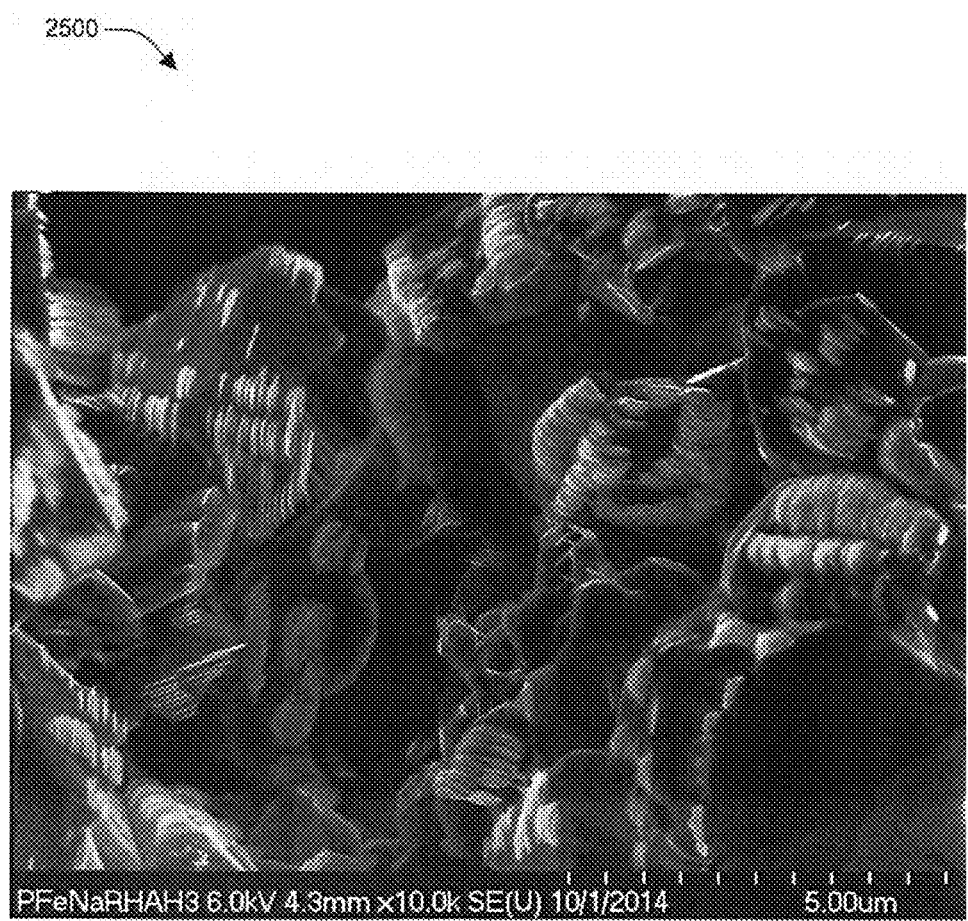
FIG. 25 is an SEM picture that illustrates one embodiment of exfoliated boron nitride nanosheets embedded in iron oxide.

FIG. 25 is the SEM picture showing exfoliated boron nitride nanosheets embedded in $Fe_2O_3$ made from a reactant mixture that contained excess amount of $FeCl_3$ and a large amount of activation agent NaF. The mass ratio of the activation agent, NaF, to the sample, hBN, is 1.5. Comparing to FIG. 8A (NaF/hBN mass ratio 0.15), the nanosheets of the layered structure is more separated and visualized more clearly.

FIG. 26 shows parallel sheets of hBN separated by glass particles. A porous hBN sample is synthesized where sheets of thin hBN layers are kept from stacking together by the inert chemicals (i.e., glass).

Figure 27:
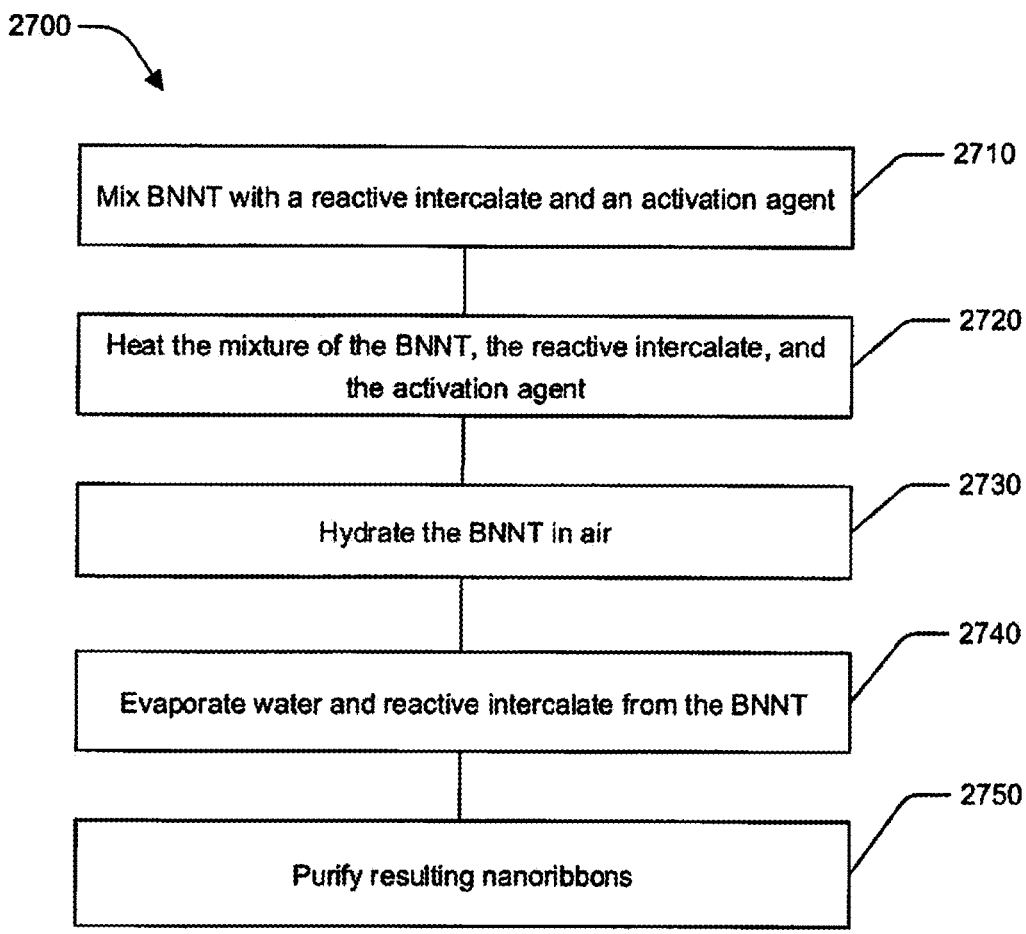
FIG. 27 illustrates one embodiment of a method that can facilitate intercalation and exfoliation of a starting reactant of BNNT.

FIG. 27 illustrates a method that can facilitate intercalation and exfoliation of a starting reactant of BNNT in accordance with aspects of the subject innovation. As discussed above with respect to FIG. 2, the starting reactant may be BNNT. At 2710, a sample of the BNNT is mixed with intercalation materials. The BNNT may be used as the starting reactant if the desired result is a layered structure having nanoribbons.

At 2720, the mixture of BNNT and the intercalation materials is heated. The heating allows the intercalation materials to enter the sample of BNNT. At 2730, the sample is exposed to moist air to hydrate the sample. At 2740, the water in the sample is then evaporated causing at the least a portion of the intercalation materials to be oxidized causing the sample to be exfoliated, thus creating boron nitride nanoribbons from the sample of the BNNT. At 2750, the nanoribbons may be purified.

Figure 28A:
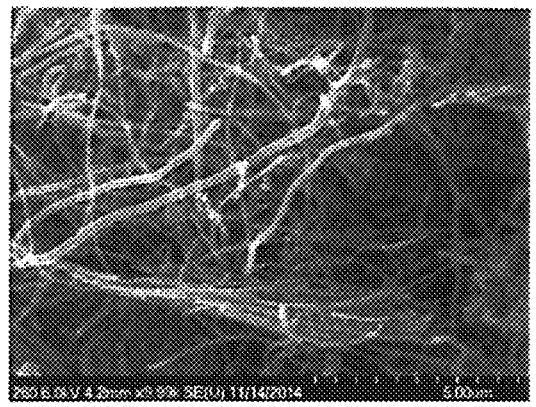
FIG. 28A is an SEM picture that illustrates a starting reactant of BNNT to be exfoliated in a method like that of FIG. 27.
Figure 28B:
FIG. 28B is a TEM picture that illustrates one embodiment of a nanotube wall that has been exfoliated into nanoribbons.

FIG. 28A illustrates a SEM of BNNT, the reactant BN. The nanoribbons resulting from the intercalation-exfoliation process of BNNT are too small to be examined by SEM. It, however, is observed by TEM (FIG. 28B). Thus, similar to the hBN-alumina composite previously described, boron nitride nanoribbon-alumina composite can be made from BNNT. The exfoliated mass of nanoribbons can be coated with alumina and hot pressed (to 2000° C. and 10 ksi) to form a BN-alumina composite.

The subject innovation, in various embodiments, includes methods that can facilitate intercalation and exfoliation of hBN. In other embodiments, the subject innovation includes intermediate products that can be associated with such methods, or articles (e.g., ceramic, composite, etc.) comprising or derived from such intermediate products.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates exfoliation of a sample, comprising:
    mixing the sample with intercalation materials, the intercalation materials include a reactive intercalate, an activation agent, and inert chemicals;
    intercalating the intercalation materials into the sample to obtain a sample intercalated with the intercalation materials; and
    exfoliating the sample intercalated with the set of intercalates to produce an exfoliated sample.

2. The method of claim 1, wherein the activation agent is in a larger ratio to the sample than the reactive intercalate.

3. The method of claim 1, wherein the inert chemicals are selected based at least in part on desired physical properties of the exfoliated samples.

4. The method of claim 1, further comprising hydrating the intercalated sample.

5. The method of claim 4, wherein the hydration comprises exposing the intercalated sample to wet air.

6. The method of claim 1, further comprising washing the exfoliated sample to remove at least a portion of the intercalation materials.

7. The method of claim 1, further comprising purifying the exfoliated sample by removing at least a portion of unwanted chemicals from the exfoliated sample.

8. The method of claim 1, further comprising purifying the exfoliated sample by removing any unwanted chemicals from the exfoliated example.

9. The method of claim 1, wherein the exfoliated sample is a ceramic composite or filler for piezoelectric and pyroelectric materials.

10. The method of claim 1, wherein the exfoliating comprises rapidly heating the intercalated sample.

11. A method that facilitates exfoliation of a sample, comprising:
    mixing the sample with intercalation materials wherein the mixing comprises mixing the sample and the intercalation materials in a ratio by weight of no more than one part of the sample for each four parts of the intercalation materials;
    intercalating the intercalation materials into the sample to obtain a sample intercalated with the intercalation materials; and
    exfoliating the sample intercalated with the set of intercalates to produce an exfoliated sample.

12. The method of claim 11, further comprising hydrating the intercalated sample.

13. The method of claim 12, wherein the hydration comprises exposing the intercalated sample to wet air.

14. The method of claim 11, further comprising washing the exfoliated sample to remove at least a portion of the intercalation materials.

15. The method of claim 11, wherein the exfoliated sample is a ceramic composite or filler for piezoelectric and pyroelectric materials.

16. The method of claim 11, wherein the exfoliating comprises rapidly heating the intercalated sample.

17. A method that facilitates exfoliation of a sample, comprising:
    mixing the sample with intercalation materials;
    intercalating the intercalation materials into the sample to obtain a sample intercalated with the intercalation materials;
    exfoliating the sample intercalated with the set of intercalates to produce an exfoliated sample;
    purifying the exfoliated sample by removing at least a portion of unwanted chemicals; and
    isolating a product of the purification;
    wherein the product comprises hexagonal boron nitride (hBN) and alumina ($Al_2O_3$), where hBN mass composition of the composite is in 60-90% range, and in-plane thermal conductivity of the composite is in a range of 85-150 W/m·K.

18. The method of claim 17, wherein the product is a ceramic composite or a filler for a composite.

19. The method of claim 17, further comprising hydrating the intercalated sample.

20. The method of claim 17, wherein the hydration comprises exposing the intercalated sample to wet air.

* * * * *